(12) United States Patent
Shin et al.

(10) Patent No.: US 10,575,272 B2
(45) Date of Patent: Feb. 25, 2020

(54) METHOD AND APPARATUS FOR SYNCHRONIZING FREQUENCY AND TIME IN A WIRELESS COMMUNICATION SYSTEM

(71) Applicant: LG ELECTRONICS INC., Seoul (KR)

(72) Inventors: Seokmin Shin, Seoul (KR); Hyunsoo Ko, Seoul (KR); Bonghoe Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 15/424,738

(22) Filed: Feb. 3, 2017

(65) Prior Publication Data
US 2017/0223648 A1    Aug. 3, 2017

Related U.S. Application Data

(60) Provisional application No. 62/290,474, filed on Feb. 3, 2016, provisional application No. 62/296,104, filed on Feb. 17, 2016.

(51) Int. Cl.
*H04W 56/00* (2009.01)
*H04B 7/212* (2006.01)

(52) U.S. Cl.
CPC ........ *H04W 56/005* (2013.01); *H04B 7/2125* (2013.01); *H04W 56/001* (2013.01); *H04W 56/0035* (2013.01); *H04W 56/0055* (2013.01)

(58) Field of Classification Search
CPC ............. H04L 27/2657; H04L 27/2675; H04L 27/2662; H04L 27/2655; H04L 27/2656; H04L 27/2663; H04L 5/0048; H04L 2027/0034; H04L 27/2659; H04L 27/266; H04L 7/08; H04J 11/0069; H04J 11/0073; H04J 11/0076; H04J 3/0614; H04J 13/0062; H04W 56/001; H04W 56/005;
(Continued)

(56) References Cited

U.S. PATENT DOCUMENTS 9,621,340 B1 *  4/2017  Gowda ..................... H04L 7/08
2011/0103534 A1 *  5/2011  Axmon ................ H04J 11/0069
375/371
(Continued)

*Primary Examiner* — Marsha D Banks Harold
*Assistant Examiner* — Elton Williams
(74) *Attorney, Agent, or Firm* — Lee Hong Degerman Kang Waimey

(57) ABSTRACT

In the present invention, a method for synchronizing frequency and time in a wireless communication system and an apparatus for supporting the same are disclosed. Particularly, a method for synchronizing frequency and time performed by a terminal in a wireless communication system may include receiving a specific signal including a PSS, compensating the specific signal with at least one time offset candidate, generating at least one first differentiation value, generating at least one second differentiation value, calculating a cross correlation value between the at least one first differentiation value and the at least one second differentiation value, and estimating a time offset and a frequency offset of the PSS based on a time offset candidate that corresponds to a greatest cross correlation value among at least one cross correlation value calculated for at least one time offset candidate.

8 Claims, 26 Drawing Sheets

(58) Field of Classification Search
CPC ............. H04W 56/0055; H04W 56/00; H04W 56/0025; H04B 7/2125
See application file for complete search history.

(56) References Cited

U.S. PATENT DOCUMENTS

| | | | |
|---|---|---|---|
| 2011/0237214 A1* | 9/2011 | Swarts | H04W 56/00 455/226.1 |
| 2016/0262123 A1* | 9/2016 | Abedini | H04W 56/0015 |
| 2017/0093540 A1* | 3/2017 | Lei | H04L 5/0044 |

\* cited by examiner (a) Single CC (b) Multiple CC (a) In-band system (b) Guard-band system (c) Stand-alone system

METHOD AND APPARATUS FOR SYNCHRONIZING FREQUENCY AND TIME IN A WIRELESS COMMUNICATION SYSTEM

CROSS-REFERENCE TO RELATED APPLICATIONS

Pursuant to 35 U.S.C. § 119(e), this application claims the benefit of U.S. Provisional Application Nos. 62/290,474 filed on Feb. 3, 2016, and 62/296,104 filed on Feb. 17, 2016, the contents of which are all hereby incorporated by reference herein in their entirety.

BACKGROUND OF THE INVENTION

Field of the Invention

The present invention relates to wireless communication systems, and more particularly, to a method for synchronizing frequency and time using a synchronization signal and an apparatus for supporting the same.

Discussion of the Related Art

The mobile communication system is developed to provide the voice service while guaranteeing the activity of a user. However, the mobile communication system is extended to the data service in addition to the voice service. Currently, since the shortage of resource is caused owing to the explosive traffic increase and users requires higher services, more developed mobile communication system is needed.

The requirement for the next mobile communication system should support the acceptance of explosive data traffic increase, the innovative increase of transmission rate per user, the acceptance of the number of connection devices which are dramatically increased, very low End-to-End Latency, high energy efficiency. To this end, various techniques have been researched such as the Dual Connectivity, the Massive Multiple Input Multiple Output (Massive MIMO), the In-band Full Duplex, the Non-Orthogonal Multiple Access (NOMA), the Super wideband support, the Device Networking, and so on.

SUMMARY OF THE INVENTION

When a frequency offset and a time offset are estimated using a synchronization signal in order for a terminal to synchronize frequency and time, a problem is caused that the complexity of receiver increases as the terminal considers all frequency offset candidates and time offset candidates.

In order to solve the problem above, the present invention proposes a method for estimating a frequency offset and a time offset with two-step operation in a wireless communication system.

In addition, in order to implement the two-step operation, the present invention proposes a method for estimating approximate frequency offset in a narrow gap and estimating a precise frequency offset based on the determined frequency candidates.

In addition, the present invention proposes a method for estimating a frequency offset and a time offset by performing a symbol-level differentiation for a received signal, performing a symbol-level differentiation for a reference signal of the predefined synchronization signal and calculating a cross correlation value, and based on the calculated cross correlation value.

In addition, the present invention proposes a method for designing an enhanced code cover for a synchronization signal.

The technical objects to attain in the present invention are not limited to the above-described technical objects and other technical objects which are not described herein will become apparent to those skilled in the art from the following description.

According to an embodiment of the present disclosure, a method for synchronizing frequency and time in a wireless communication system, the method performed by a terminal comprises receiving, from a base station, a specific signal including a primary synchronization signal (PSS); compensating the specific signal with at least one time offset candidate; generating at least one first differential value by differentiating the specific signal in a symbol unit; generating at least one second differential value by differentiating a reference signal for the PSS in a symbol unit; calculating a cross correlation value between the generated at least one first differential value and the generated at least one second differential value; and estimating a time offset and a frequency offset of the PSS included in the specific signal, based on a time offset candidate corresponding to a largest cross correlation value in at least one cross correlation value calculated for the at least one time offset candidate.

In addition, the method further comprises detecting a secondary synchronization signal by using the estimated time offset and the estimated frequency offset.

In addition, the reference signal for the PSS is generated according to a predefined rule between the terminal and the base station.

In addition, the differentiation comprises a differentiation applied between at least one first sample included in a first symbol and at least one second sample included in a second symbol adjacent to the first symbol; and the at least one first sample and the at least one second sample are generated by performing fast fourier transform (FFT) operation.

In addition, the calculating the cross correlation value between the generated at least one first differential value and the generated at least one second differential value comprises calculating at least one cross correlation value based on the generated at least one first differential value and the generated at least one second differential value; and identifying a peak value in the at least one cross correlation value.

In addition, the at least one time offset candidate is selected among a plurality time offset candidates related to time synchronization for the specific signal.

In addition, the estimating the time offset and the frequency offset of the PSS included in the specific signal, based on the time offset candidate corresponding to the largest cross correlation value comprises determining the time offset candidate corresponding to a largest cross correlation value as an estimated time offset for the PSS; and determining an estimated frequency offset for the PSS based on the determined estimated time offset.

In addition, the determining the estimated frequency offset for the PSS based on the determined estimated time offset comprises compensating, in a time domain, the specific signal by using the determined estimated time offset; and estimating the frequency offset by performing a conjugated multiplexing operation on the compensated specific signal and the reference signal for the PSS.

In addition, the estimated frequency offset is determined based on a correlation function between a frequency shifted specific signal and the reference signal for the PSS, when the PSS included in the specific signal is configured with a Zadoff Chu sequence; and the correlation function is represented in the form of a delta function (Dirac delta function).

In addition, the method further comprises when a cover code is included in the PSS, generating at least one third differential value by differentiating the cover code in a symbol unit; and calculating a cross correlation value between the generated at least one first differential value and the generated at least one third differential value.

In addition, the PSS included in the specific signal comprises a synchronization signal for a wireless communication system supporting a narrowband system.

In addition, according to another embodiment of the present invention, an apparatus for synchronizing frequency and time in a wireless communication system comprises a transmission/reception unit for transmitting and receiving a radio signal, and a processor functionally coupled to the transmission/reception unit. In here, the processor is configured to control to receive, from a base station, a specific signal including a primary synchronization signal (PSS); compensate the specific signal with at least one time offset candidate; generate at least one first differential value by differentiating the specific signal in a symbol unit; generate at least one second differential value by differentiating a reference signal for the PSS in a symbol unit; calculate a cross correlation value between the generated at least one first differential value and the generated at least one second differential value; and estimate a time offset and a frequency offset of the PSS included in the specific signal, based on a time offset candidate corresponding to a largest cross correlation value in at least one cross correlation value calculated for the at least one time offset candidate.

BRIEF DESCRIPTION OF THE DRAWINGS

The accompanying drawings, which are included herein as a part of the description for help understanding the present invention, provide embodiments of the present invention, and describe the technical features of the present invention with the description below.

DETAILED DESCRIPTION OF THE INVENTION

Figure 1:
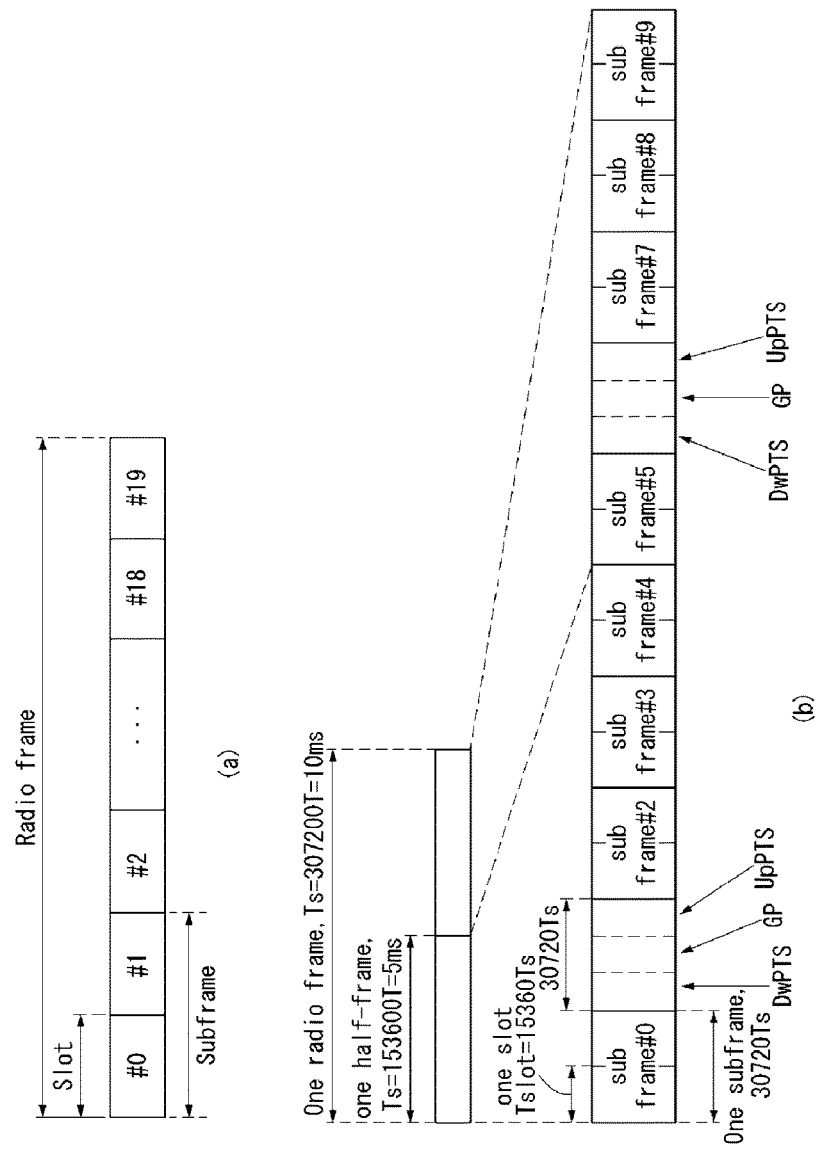
FIG. 1 illustrates the structure of a radio frame in a wireless communication system to which the present invention may be applied.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows he uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe in a radio frame, 'D' represents a subframe for a downlink transmission, 'U' represent a subframe for an uplink transmission, 'S' represents a special subframe that includes three types, a Downlink Pilot Time Slot (DwPTS), a Guard Period (GP) and an Uplink Pilot Time Slot (UpPTS).

The DwPTS is used for an initial cell search, synchronization or channel estimation in a terminal. The UpPTS is used for the channel estimation in a BS and synchronizing an uplink transmission synchronization of a terminal. The GP is a period for removing interference occurred in uplink owing to multi-path latency of a downlink signal between uplink and downlink.

Each subframe i includes slot 2i and slot 2i+1 of T_slot=15360*T_s=0.5 ms length.

There are seven types of uplink-downlink configurations and the position and/or number of downlink subframe, special subframe and uplink subframe are different for each configuration.

The time switched from downlink to uplink or the time switched from uplink to downlink is referred to as a switching point. The periodicity of the switching point means a period in which the phenomenon of unlink subframe and downlink subframe being switched is repeated in the same pattern, and both 5 ms and 10 ms are supported. In the case of a period of 5 ms downlink-uplink switching point, the special subframe(s) is existed in every half-frame, and in the case of a period of 10 ms downlink-uplink switching point, the special subframe(s) is existed in the first half-frame only.

For all configurations, 0th, fifth subframes and the DwPTS are durations only for a downlink transmission. The subframe directly following the UpPTS and subframe are durations for an uplink transmission always.

Such an uplink-downlink configuration is the system information, and may be known to a BS and a terminal. A BS may notify the change of the uplink-downlink allocation state of a radio frame by transmitting an index of configuration information only whenever the uplink-downlink configuration information is changed. In addition, the configuration information is a sort of downlink control information and may be transmitted through a Physical Downlink Control Channel (PDCCH) like other scheduling information, or it is the broadcast information and may be commonly transmitted to all terminals in a cell through a broadcast channel.

Table 2 represents a configuration (lengths of DwPTS/GP/UpPTS) of a special subframe.

Figure 2:
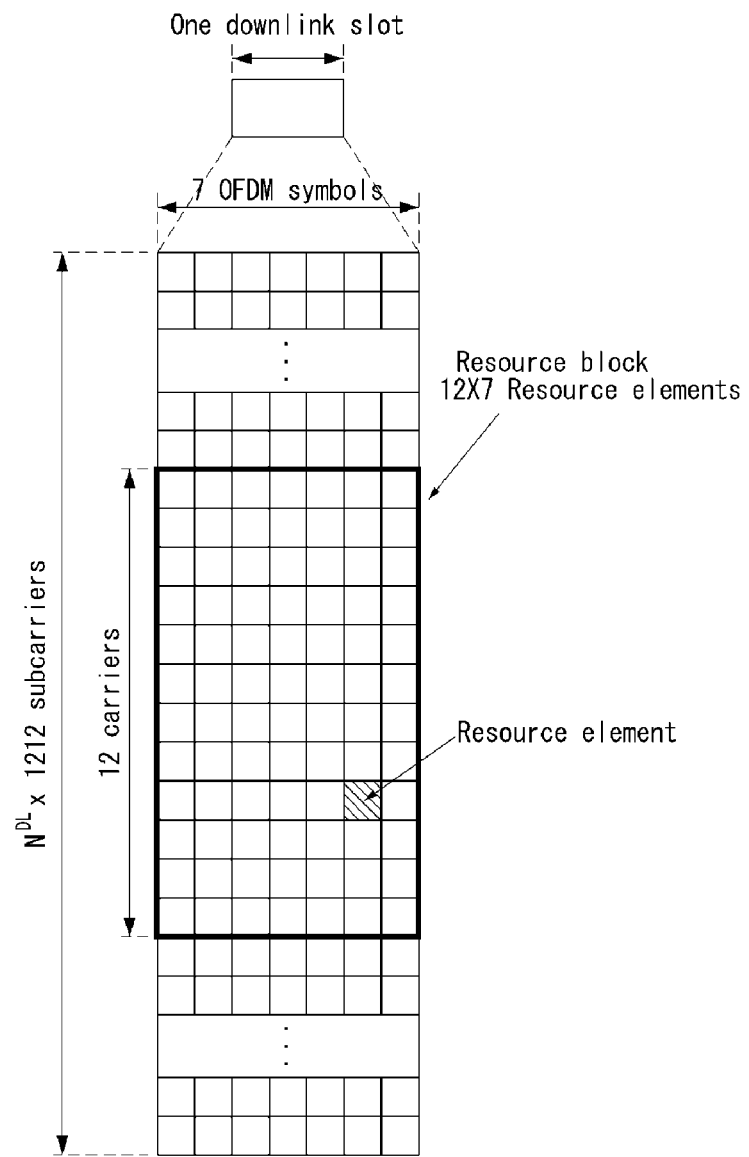
FIG. 2 is a diagram illustrating a resource grid for a downlink slot in a wireless communication system to which the present invention may be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
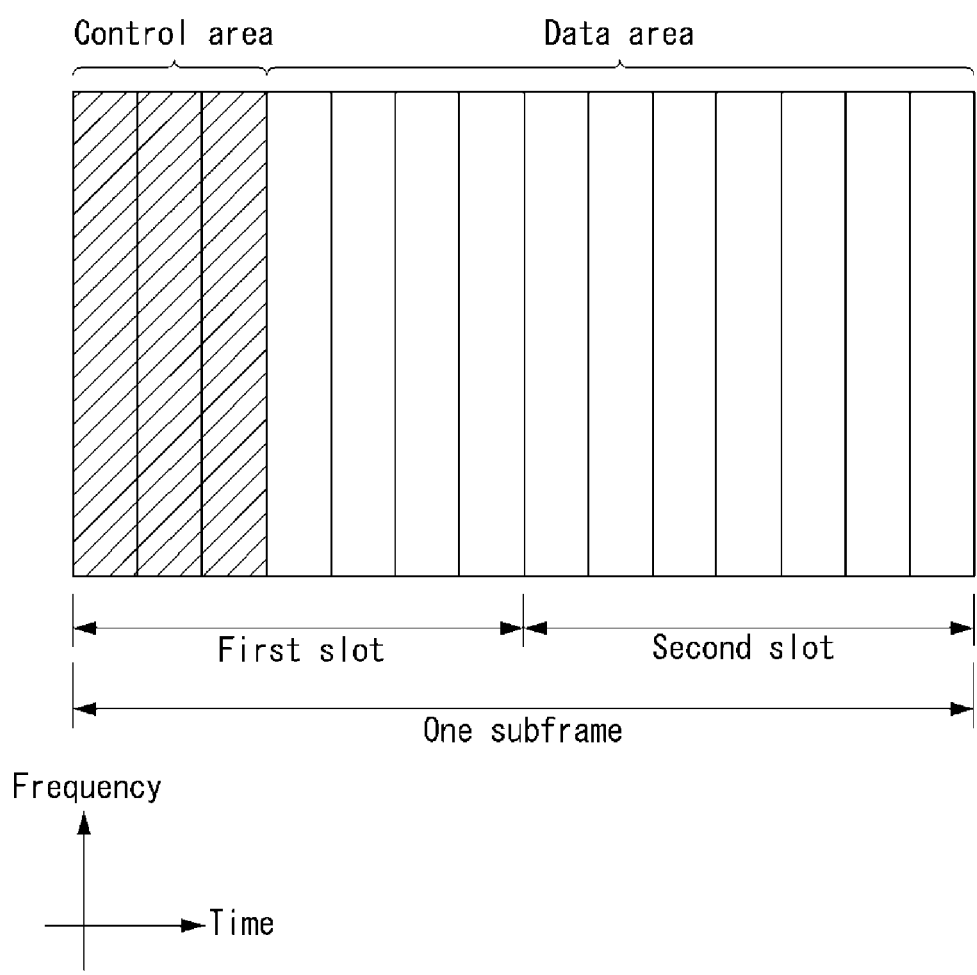
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · T_s | 2192 · T_s | 2560 · T_s | 7680 · T_s | 2192 · T_s | 2560 · T_s |
| 1 | 19760 · T_s | | | 20480 · T_s | | |
| 2 | 21952 · T_s | | | 23040 · T_s | | |
| 3 | 24144 · T_s | | | 25600 · T_s | | |
| 4 | 26336 · T_s | | | 7680 · T_s | 4384 · T_s | 5120 · T_s |
| 5 | 6592 · T_s | 4384 · T_s | 5120 · T_s | 20480 · T_s | | |
| 6 | 19760 · T_s | | | 23040 · T_s | | |
| 7 | 21952 · T_s | | | — | — | — |
| 8 | 24144 · T_s | | | — | — | — |

The radio frame structure according to an example of FIG. 1 is just an example, but the number of subcarriers included in a radio frame, the number of slots included in a subframe or the number of OFDM symbols included in a slot may be changed in various manners.

FIG. 2 is a diagram illustrating a resource grid for one downlink slot in the wireless communication system to which the present invention can be applied.

information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
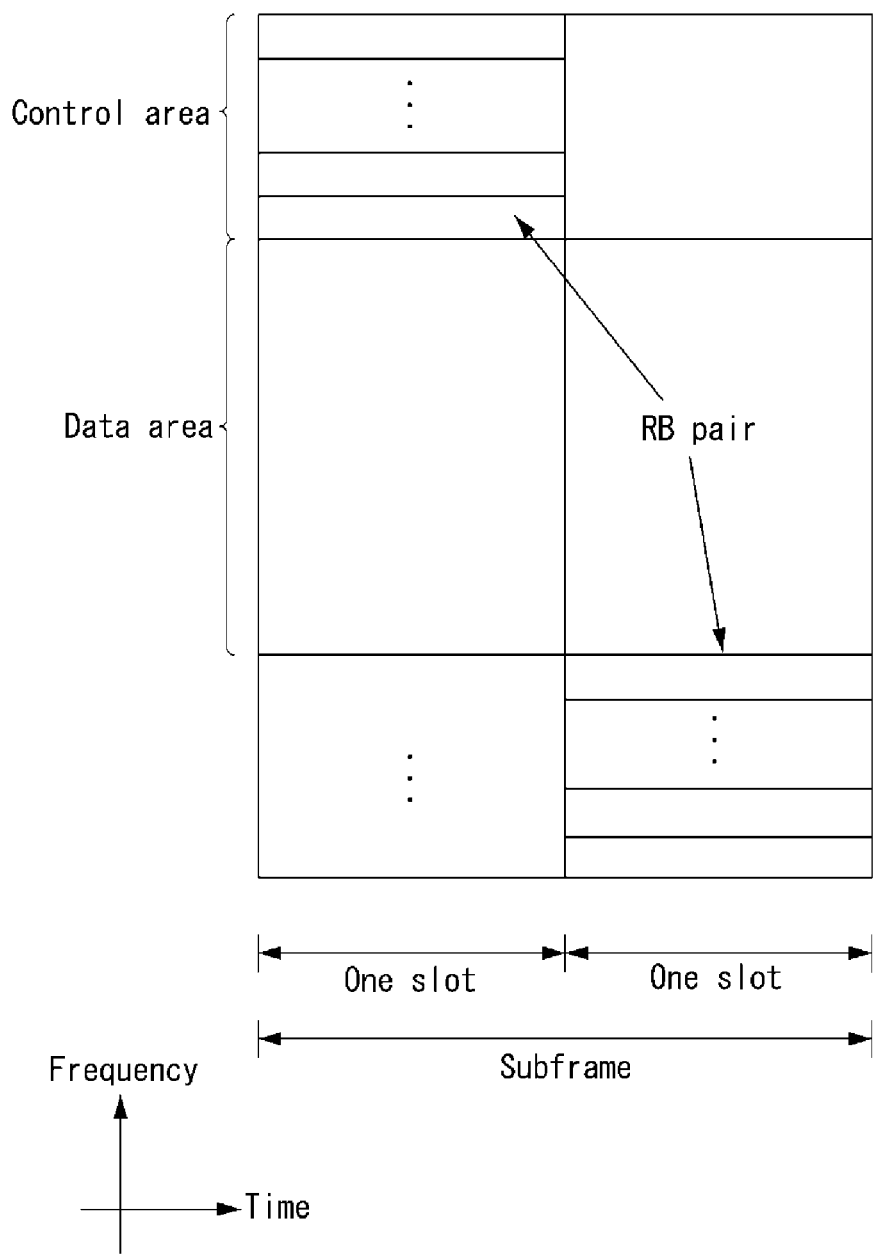
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

Figure 5:
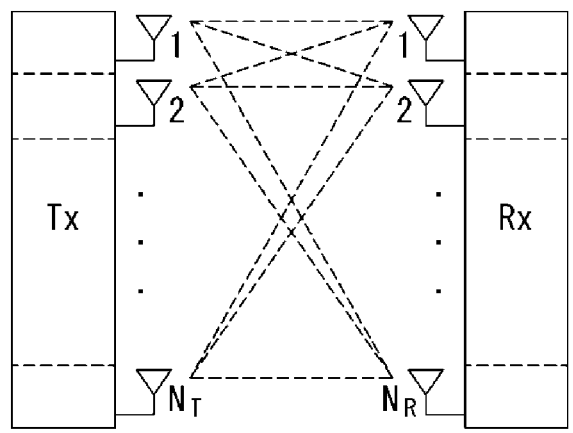
FIG. 5 illustrates the configuration of a known MIMO communication system.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epchally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \quad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, since the maximum number of transmittable information is NT, NT may be expressed as a vector given below.

$$s=[s_1,s_2,\ldots,s_{N_T}]^T \quad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y=[y_1,y_2,\ldots,y_{N_R}]^T \quad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

Figure 6:
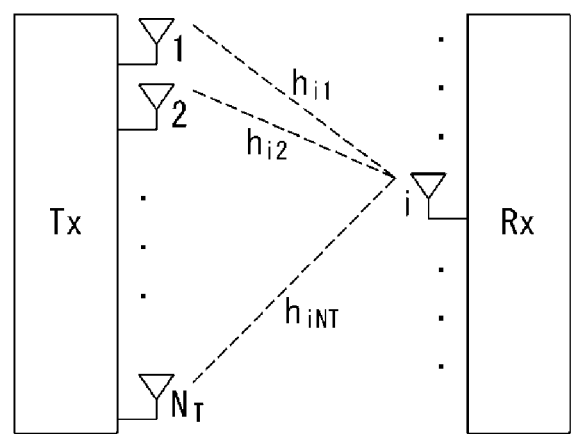
FIG. 6 is a diagram showing a channel from a plurality of transmission antennas to a single reception antenna.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T=[h_{i1},h_{i2},\ldots,h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

Meanwhile, since additive white Gaussian noise (AWGN) is added after passing through a channel matrix H given above in an actual channel, white noises n1, n2, . . . , nNR added to NR receiving antennas, respectively are expressed as below.

$$n=[n_1,n_2,\ldots,n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

[Equation 10]

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 7:
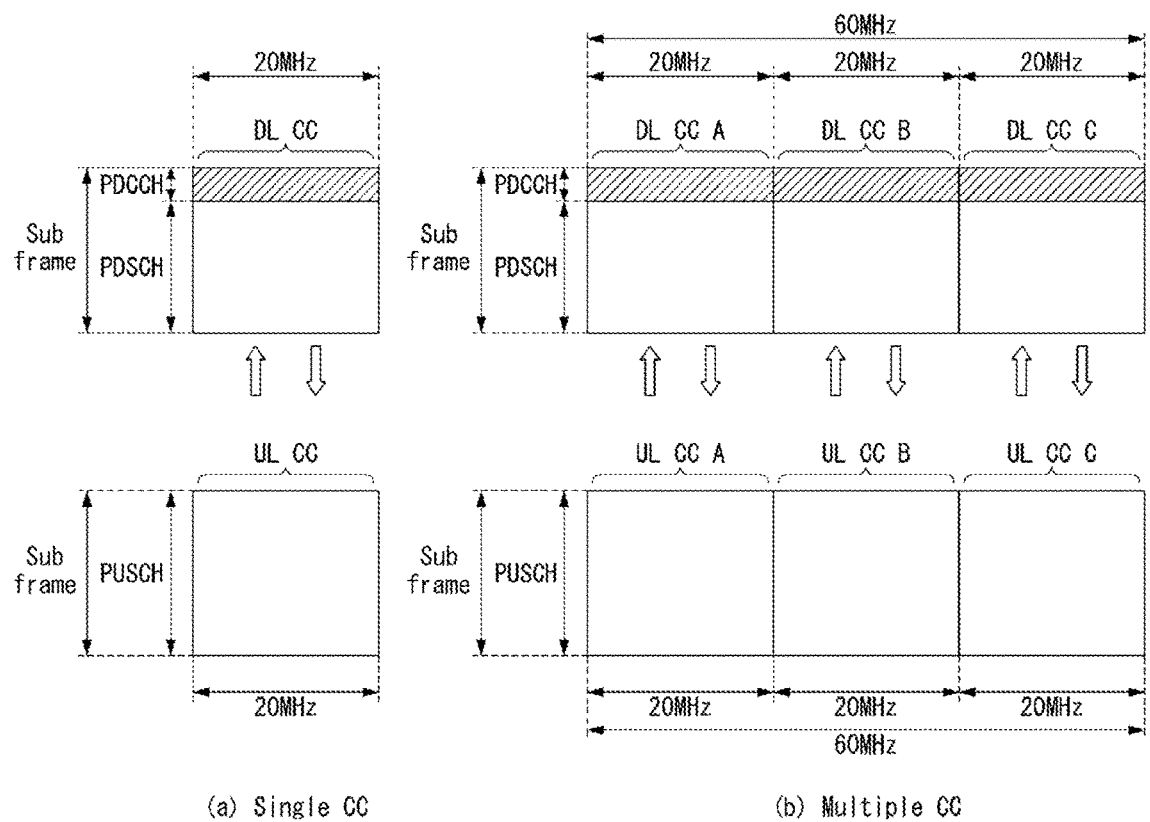
FIG. 7 illustrates an example of component carriers and a carrier aggregation in a wireless communication system to which an embodiment of the present invention may be applied.

FIG. 7 illustrates examples of a component carrier and carrier aggregation in the wireless communication system to which the present invention can be applied.

FIG. 7*a* illustrates a single carrier structure used in an LTE system. The component carrier includes the DL CC and the UL CC. One component carrier may have a frequency range of 20 MHz.

FIG. 7*b* illustrates a carrier aggregation structure used in the LTE system. In the case of FIG. 7*b*, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Figure 8:
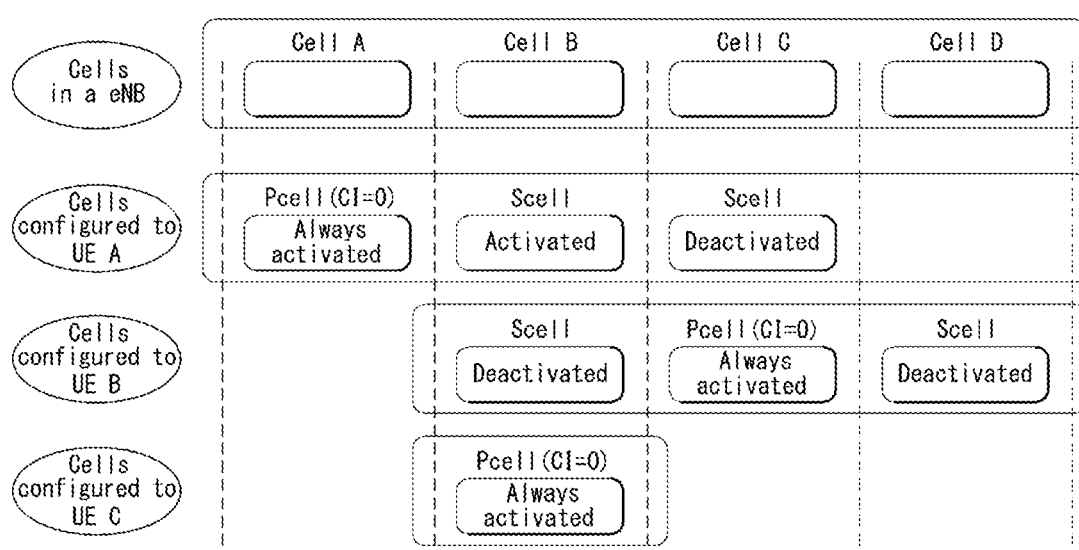
FIG. 8 is a diagram illustrating a cell classification in a system that supports the carrier aggregation.

FIG. 8 is a diagram illustrating a cell classification in a system that supports the carrier aggregation.

Referring to FIG. 8, a configured cell is a cell that should be carrier-merged based on a measurement report among the cells of a BS as shown in FIG. 7, may be configured for each terminal. The configured cell may reserve a resource for an ACK/NACK transmission for a PDSCH transmission beforehand. An activated cell is a cell that is configured to transmit PDSCH/PUSCH actually among the configured cells, and performs a Channel State Information (CSI) report for the PDSCH/PUSCH transmission and a Sounding Reference Signal (SRS) transmission. A de-activated cell is a cell that does not transmit the PDSCH/PUSCH transmission by a command of BS or a timer operation, may also stop the CSI report and the SRS transmission.

Synchronization Signal/Sequence (SS)

An SS includes a primary (P)-SS and a secondary (S)-SS, and corresponds to a signal used when a cell search is performed.

Figure 9:
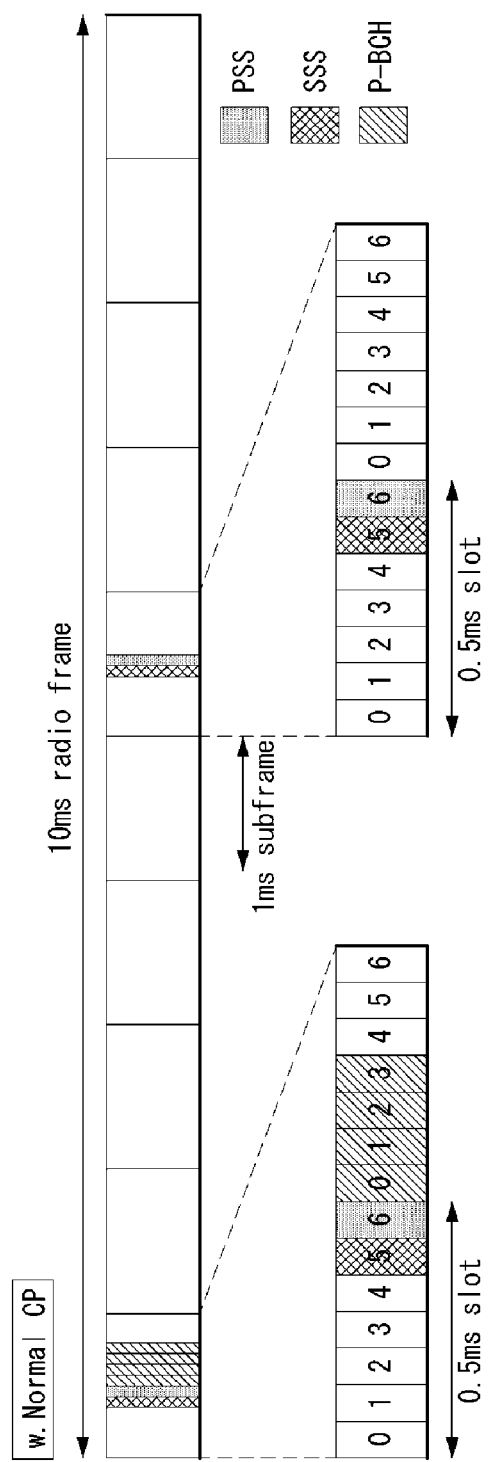
FIG. 9 is a diagram illustrating a frame structure used for an SS transmission in a system that uses a normal cyclic prefix (CP).
Figure 10:
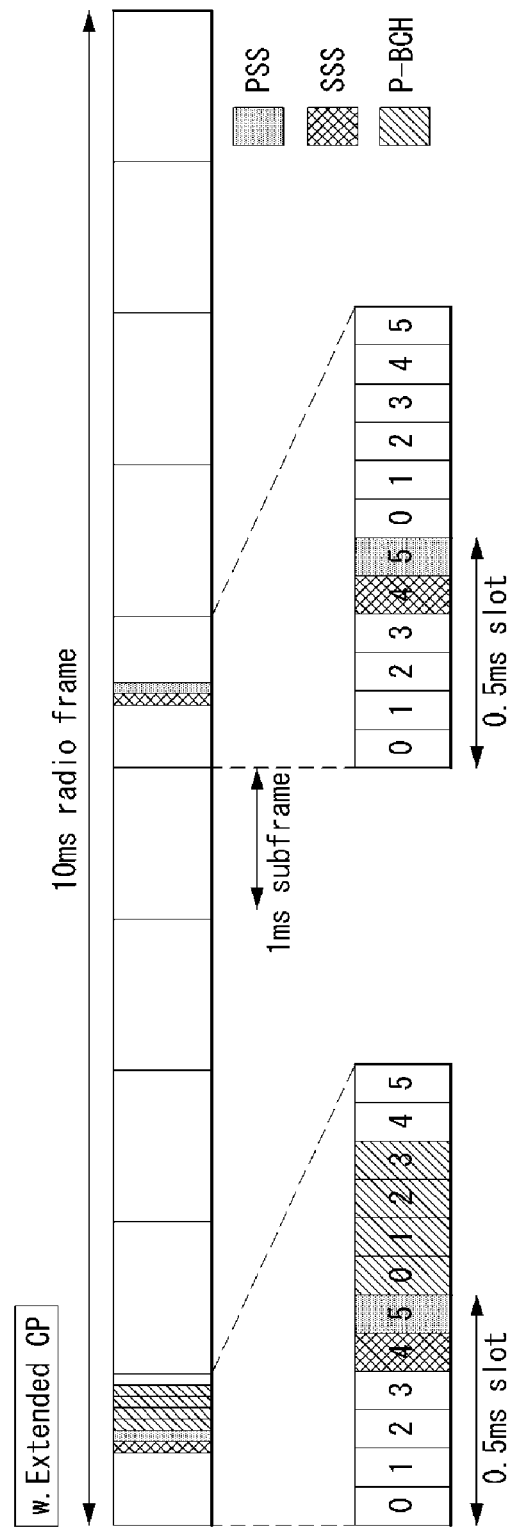
FIG. 10 is a diagram illustrating a frame structure used for an SS transmission in a system that uses an extended CP.

FIG. 9 is a diagram illustrating a frame structure used for an SS transmission in a system that uses a normal cyclic prefix (CP). FIG. 10 is a diagram illustrating a frame structure used for an SS transmission in a system that uses an extended CP.

The SS is transmitted in 0th subframe and second slot of the fifth subframe, respectively, considering 4.6 ms which is a Global System for Mobile communications (GSM) frame length for the easiness of an inter-Radio Access Technology (RAT) measurement, and a boundary for the corresponding radio frame may be detected through the S-SS. The P-SS is transmitted in the last OFDM symbol of the corresponding slot and the S-SS is transmitted in the previous OFDM symbol of the P-SS.

The SS may transmit total 504 physical cell IDs through the combination of 3 P-SSs and 168 S-SSs. In addition, the SS and the PBCH are transmitted within 6 RBs at the center of a system bandwidth such that a terminal may detect or decode them regardless of the transmission bandwidth.

A transmission diversity scheme of the SS is to use a single antenna port only and not separately used in a standard. That is, the transmission diversity scheme of the SS uses a single antenna transmission or a transmission technique transparent to a terminal (e.g., Precoder Vector Switching (PVS), Time-Switched Transmit Diversity (TSTD) and Cyclic-Delay Diversity (CDD)).

1. P-SS Sign

Zadoff-Chu (ZC) sequence of length 63 in frequency domain may be defined and used as a sequence of the P-SS. The ZC sequence is defined by Equation 12, a sequence element, n=31 that corresponds to a DC subcarrier is punctured. In Equation 12, N_zc=63.

$$d_u(n) = e^{-j\frac{\pi u n(n+1)}{N_{ZC}}}$$ [Equation 12]

Among 6 RBs (=7 subcarriers) positioned at the center of frequency domain, the remaining 9 subcarriers are always transmitted in zero value, which makes it easy to design a filter for performing synchronization. In order to define total three P-SSs, the value of u=29, 29 and 34 may be used in Equation 12. In this case, since 29 and 34 have the conjugate symmetry relation, two correlations may be simultaneously performed. Here, the conjugate symmetry means Equation 13. By using the characteristics, it is possible to implement one shot correlater for u=29 and 43, and accordingly, about 33.3% of total amount of calculation may be decreased.

$$d_u(n)=(-1)^n(d_{N_{ZC}-u}(n))^*, \text{ when } N_{ZC} \text{ is even number.}$$

$$d_u(n)=(d_{N_{ZC}-u}(n))^*, \text{ when } N_{ZC} \text{ is odd number.}$$ [Equation 13]

2. S-SS Sign

The sequence used for the S-SS is combined with two interleaved m-sequences of length 31, and 168 cell group IDs are transmitted by combining two sequences. The m-sequence as the SSS sequence is robust in the frequency selective environment, and may be transformed to the high-speed m-sequence using the Fast Hadamard Transform, thereby the amount of operations being decreased. In addition, the configuration of SSS using two short codes is proposed to decrease the amount of operations of terminal.

Figure 11:
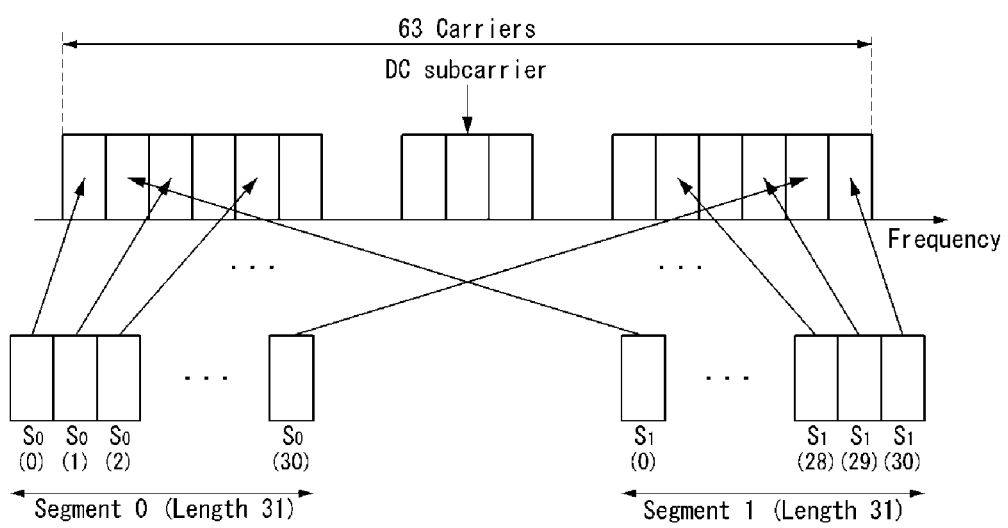
FIG. 11 is a diagram illustrating two sequences in a logical region being mapped to a physical region by being interleaved.

FIG. 11 is a diagram illustrating two sequences in a logical region being mapped to a physical region by being interleaved.

Referring to FIG. 11, when two m-sequences used for generating the S-SS sign are defined by S1 and S2, in the case that the S-SS (S1, S2) of subframe 0 transmits the cell group ID with the combination, the S-SS (S2, S1) of subframe 5 is transmitted with being swapped, thereby distinguishing the 10 ms frame boundary. In this case, the SSS sign uses the generation polynomial x5+x2+1, and total 31 signs may be generated through the circular shift.

In order to improve the reception performance, two different P-SS-based sequences are defined and scrambled to the S-SS, and scrambled to S1 and S2 with different sequences. Later, by defining the S1-based scrambling sign, the scrambling is performed to S2. In this case, the sign of S-SS is exchanged in a unit of 5 ms, but the P-SS-based scrambling sign is not exchanged. The P-SS-based scrambling sign is defined by six circular shift versions according to the P-SS index in the m-sequence generated from the generation polynomial x5+x2+1, and the S1-based scrambling sign is defined by eight circular shift versions according to the S1 index in the m-sequence generated from the generation polynomial x5+x4+x2+x1+1.

The contents below exemplify an asynchronous standard of the LTE system.

A terminal may monitor a downlink link quality based on a cell-specific reference signal in order to detect a downlink radio link quality of PCell.

A terminal may estimate a downlink radio link quality for the purpose of monitoring the downlink radio link quality of PCell, and may compare it with Q_out and Q_in, which are thresholds.

The threshold value Q_out may be defined as a level in which a downlink radio link is not certainly received, and may correspond to a block error rate 10% of a hypothetical PDCCH transmission considering a PCFICH together with transmission parameters.

The threshold value Q_in may be defined as a downlink radio link quality level, which may be great and more certainly received than Q_out, and may correspond to a block error rate 2% of a hypothetical PDCCH transmission considering a PCFICH together with transmission parameters.

Narrow Band (NB) LTE Cell Search

In the NB-LTE, although a cell search may follow the same rule as the LTE, there may be an appropriate modification in the sequence design in order to increase the cell search capability.

Figure 12:
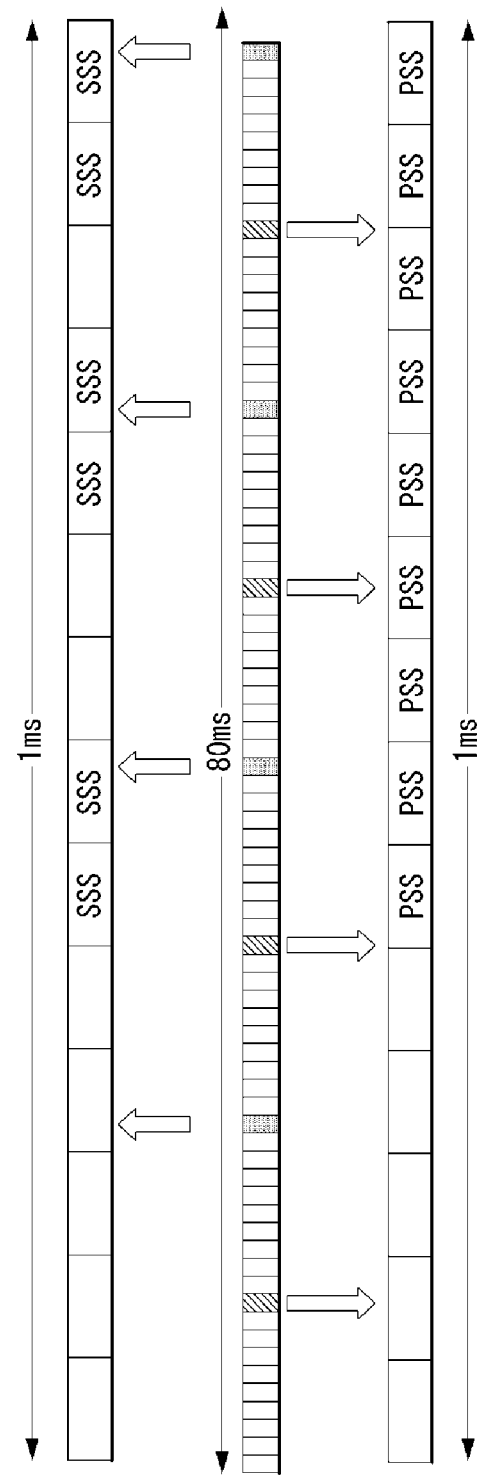
FIG. 12 is a diagram illustrating a frame structure to which M-PSS and M-SSS are mapped.

FIG. 12 is a diagram illustrating a frame structure to which M-PSS and M-SSS are mapped. In the present disclosure, an M-PSS designates the P-SS in the NB-LTE, and an M-SSS designates the S-SS in the NB-LTE. The M-PSS may also be designated to 'NB-PSS' and the M-SSS may also be designated to 'NB-SSS'.

Referring to FIG. 12, in the case of the M-PSS, a single primary synchronization sequence/signal may be used. (M-)PSS may be spanned up to 9 OFDM symbol lengths, and used for determining subframe timing as well as an accurate frequency offset.

This may be interpreted that a terminal may use the M-PSS for acquiring time and frequency synchronization with a BS. In this case, (M-)PSS may be consecutively located in time domain.

The M-SSS may be spanned up to 6 OFDM symbol lengths, and used for determining the timing of a cell identifier and an M-frame. This may be interpreted that a terminal may use the M-SSS for detecting an identifier of a BS. In order to support the same number as the number of cell identifier groups of the LTE, 504 different (M-)SSS may be designed.

Referring to the design of FIG. 12, the M-PSS and the M-SSS are repeated every 20 ms average, and existed/generated four times in a block of 80 ms. In the subframes that include synchronization sequences, the M-PSS occupies the last 9 OFDM symbols. The M-SSS occupies 6th, 7th, 10th, 11th, 13th and 14th OFDM symbols in the case of normal CP, and occupies 5th, 6th, 9th, 11th and 12th OFDM symbols in the case of extended CP.

The 9 OFDM symbols occupied by the M-PSS may be selected to support for the in-band disposition between LTE carriers. This is because the first three OFDM symbols are used to carry a PDCCH in the hosting LTE system and a subframe includes minimum twelve OFDM symbols (in the case of extended CP).

In the hosting LTE system, a cell-specific reference signal (CRS) is transmitted, and the resource elements that correspond to the M-PSS may be punctured in order to avoid a collision. In the NB-LTE, a specific position of M-PSS/M-SSS may be determined to avoid a collision with many legacy LTE signals such as the PDCCH, the PCFICH, the PHICH and/or the MBSFN.

In comparison with the LTE, the synchronization sequence design in the NB-LTE may be different.

This may be performed in order to attain a compromise between decreased memory consumption and faster synchronization in a terminal. Since the M-SSS is repeated four times in 80 ms duration, a slight design modification for the M-SSS may be required in the 80 ms duration in order to solve a timing uncertainty.

Structure of M-PSS and M-SSS

In the LTE, the PSS structure allows the low complexity design of timing and frequency offset measuring instrument, and the SSS is designed to acquire frame timing and to support unique 504 cell identifiers.

In the case of In-band and Guard-band of the LTE, the disposition of CP in the NB-LTE may be selected to match the CP in a hosting system. In the case of standalone, the extended CP may be used for matching a transmitter pulse shape for exerting the minimum damage to the hosting system (e.g., GSM).

A single M-PSS may be clearly stated in the N-LTE of the LTE. In the procedure of PSS synchronization of the LTE, for each of PSSs, a specific number of frequency speculations may be used for the coarse estimation of symbol timing and frequency offset.

Such an adaption of the procedure in the NB-LTE may increase the process complexity of a receiver according to the use of a plurality of frequency assumptions. In order to solve the problem, a sequence resembling of the Zadoff-Chu sequence which is differentially decoded in time domain may be proposed for the M-PSS. Since the differential decoding is performed in a transmission process, the differential decoding may be performed during the processing time of a receiver. Consequently, a frequency offset may be transformed from the consecutive rotation for symbols to the fixed phase offset with respect to the corresponding symbols.

Figure 13:
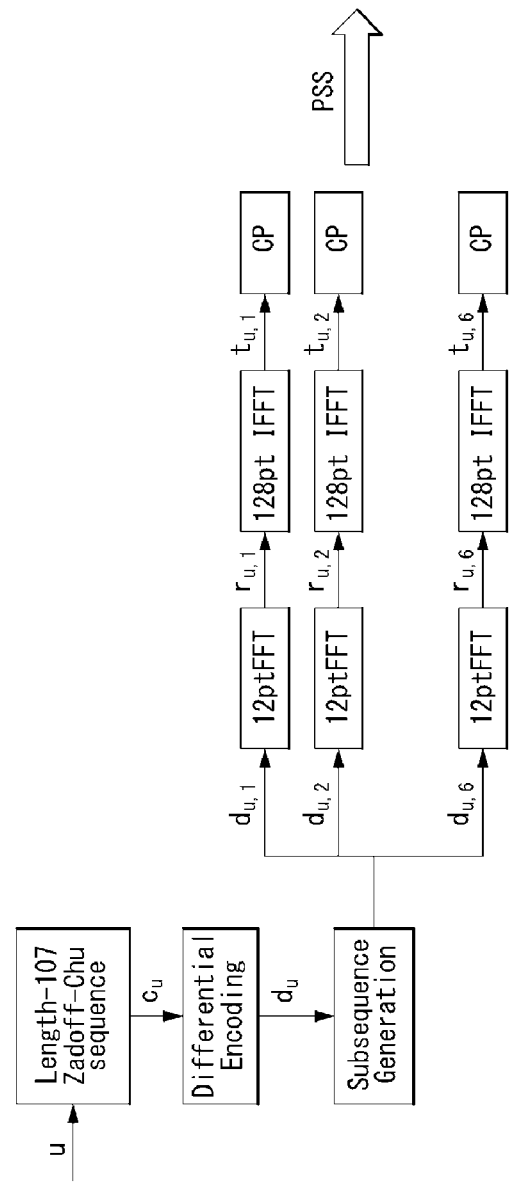
FIG. 13 is a diagram illustrating a method for generating M-PSS according to an embodiment of the present invention.

FIG. 13 is a diagram illustrating a method for generating M-PSS according to an embodiment of the present invention.

Referring to FIG. 13, first, when starting with a basic sequence of length 107 as a basis in order to generate an M-PSS, Equation 14 below may be obtained.

$$c(n) = e^{-\frac{j\pi un(n+1)}{N}}, \quad n = \{0, 1, 2, \ldots, 106\}$$ [Equation 14]

The basic sequence c(n) may be differentially decoded in order to obtain d(n) sequence as represented in Equation 15.

$$d(n+1)=d(n)c(n), n=\{0,1,2,\ldots,106\}, d(0)=1,$$ [Equation 15]

The d(n) sequence is divided into 9 sub sequences, and each sub sequence has a length 12 and a sampling rate of 130 kHz. The 120-point FFT is performed for each of 9 sub sequences, and each sequence may be oversampled 128/12 times up to 1.92 MHz sampling rate using 128 IFFT zero padding. Consequently, each sub sequence may be mapped to 12 subcarriers for 9 OFDM symbols, respectively.

Each of the sub sequences is mapped to a single OFDM symbol, and the M-PSS may occupy total 9 OFDM symbols since total 9 sub sequences are existed. Total length of the M-PSS may be 1234(=(128+9)*9+1) when the normal CP of 9 samples are used, and may be 1440 when the extended CP is used.

The M-PSS which is going to be actually used during the transmission is not required to be generated every time using complex procedure in a transmitter/receiver in the same manner. The complexity coefficient (i.e., t_u(n)) that corresponds to the M-PSS may be generated in offline, and directly stored in the transmitter/receiver. In addition, even in the case that the M-PSS is generated in 1.92 MHz, the occupation bandwidth may be 180 kHz.

Accordingly, in the case of performing the procedure related to time and frequency offset measurements using the M-PSS in a receiver, the sampling rate of 192 kHz may be used for all cases. This may significantly decrease the complexity of receiver in the cell search.

In comparison with the LTE, the frequency in which the M-PSS is generated in the NB-LTE causes slightly greater overhead than the PSS in the LTE. More particularly, the synchronization sequence used in the LTE occupies 2.86% of the entire transmission resources, and the synchronization sequence used in the NB-LTE occupies about 5.36% of the entire transmission resources. Such an additional overhead has an effect of decreasing memory consumption as well as the synchronization time that leads to the improved battery life and the lower device price.

The M-SSS is designed in frequency domain and occupies 12 subcarriers in each of 6 OFDM symbols. Accordingly, the number of resource elements dedicated to the M-SSS may be 72. The M-SSS includes the ZC sequence of a single length 61 which are padded by eleven '0's on the starting point.

In the case of the extended CP, the first 12 symbols of the M-SSS may be discarded, and the remaining symbols may be mapped to the valid OFDM symbols, which cause to discard only a single symbol among the sequence of length 61 since eleven '0's are existed on the starting point. The discard of the symbol causes the slight degradation of the correlation property of other SSS.

The cyclic shift of a sequence and the sequence for different roots may easily provide specific cell identifiers up to 504. The reason why the ZC sequence is used in the NB-LTE in comparison with the LTE is to decrease the error detection rate. Since a common sequence for two different cell identifier groups is existed, an additional procedure is required in the LTE.

Since the M-PSS/M-SSS occur four times within the block of 80 ms, the LTE design of the SSS cannot be used for providing accurate timing information within the corresponding block. This is because the special interleaving structure that may determine only two positions. Accordingly, a scrambling sequence may be used in an upper part of the ZC sequence in order to provide the information of frame timing. Four scrambling sequences may be required to determine four positions within the block of 80 ms, which may influence on acquiring the accurate timing.

Figure 14:
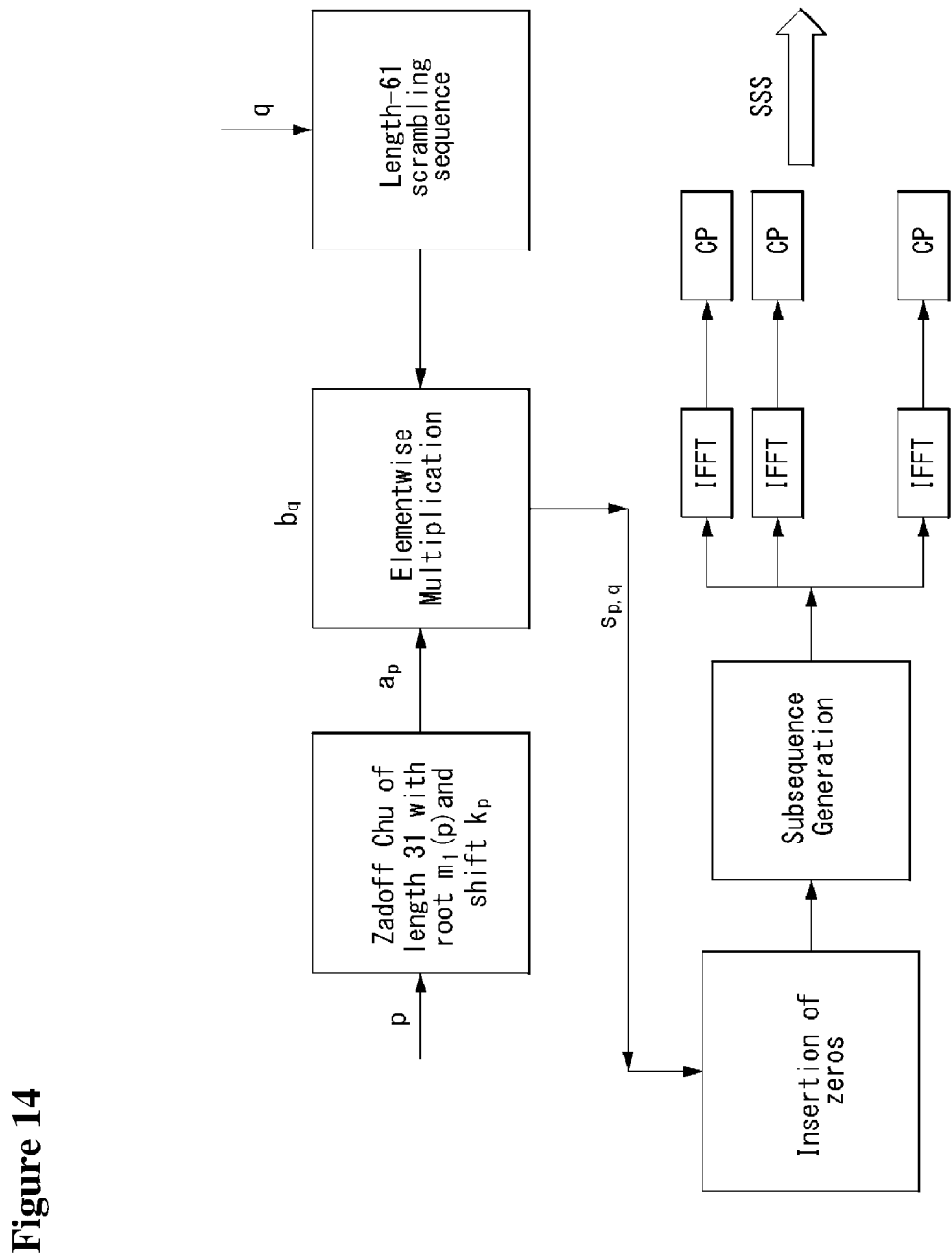
FIG. 14 is a diagram illustrating a method for generating M-SSS according to an embodiment of the present invention.

FIG. 14 is a diagram illustrating a method for generating M-SSS according to an embodiment of the present invention.

Referring to FIG. 14, the M-SSS may be defined as s_p,q(n)=a_p(n)·b_q(n). Herein, p={0, 1, . . . , 503} represents cell identifiers and q={0, 1, 2, 3} determines the position of the M-SSS (i.e., the number of M-SSS within the block of 80 ms which is generated before the latest SSS). In addition, a_p(n) and b_q(n) may be determined by Equations 16 and 17 below.

$$a_p(n) = 0, \quad n = \{0-4, 66-71\}$$ [Equation 16]
$$= a_p(n - k_p - 5), \quad n = \{5, 6, \ldots, 65\}$$
$$a_p(n) = e^{-\frac{j\pi m(p)n(n+1)}{61}}, \quad n = \{0, 1, \ldots, 61\}$$

-continued $$b_q(n) = b(\text{mod}(n - l_q, 63)) \quad \text{[Equation 17]}$$
$$n = \{0, 1, \ldots 60\}, \quad q = \{0, 1, 2, 3\},$$
$$l_0 = 0, l_1 = 3, l_2 = 7, l_3 = 11$$
$$b(n + 6) = \text{mod}(b(n) + b(n + 1), 2),$$
$$n = \{0, 1, \ldots 55\},$$
$$b(0) = 1, b(m) = 0, \quad m = \{1, 2, 3, 4, 5\}$$

Referring to Equation 16, a_p(n) is the ZC sequence and determines a cell identifier group. m(p) and cyclic shift k_p may be used for providing a specific cell identifier. Referring to Equation 17, b_q(n) may be the scrambling sequence that includes a cyclic shift of the basic sequence b_(n), and may be used for indicating the position of the M-SSS in the M-frame in order to acquire the frame timing. The cyclic shift l_q may be determined according to the value q.

The value of m(p) with respect to the specific p may be determined such as m(p)=1+mod(p, 61), the value of k_p may be determined such as k_p=7[p/61].

Figure 15:
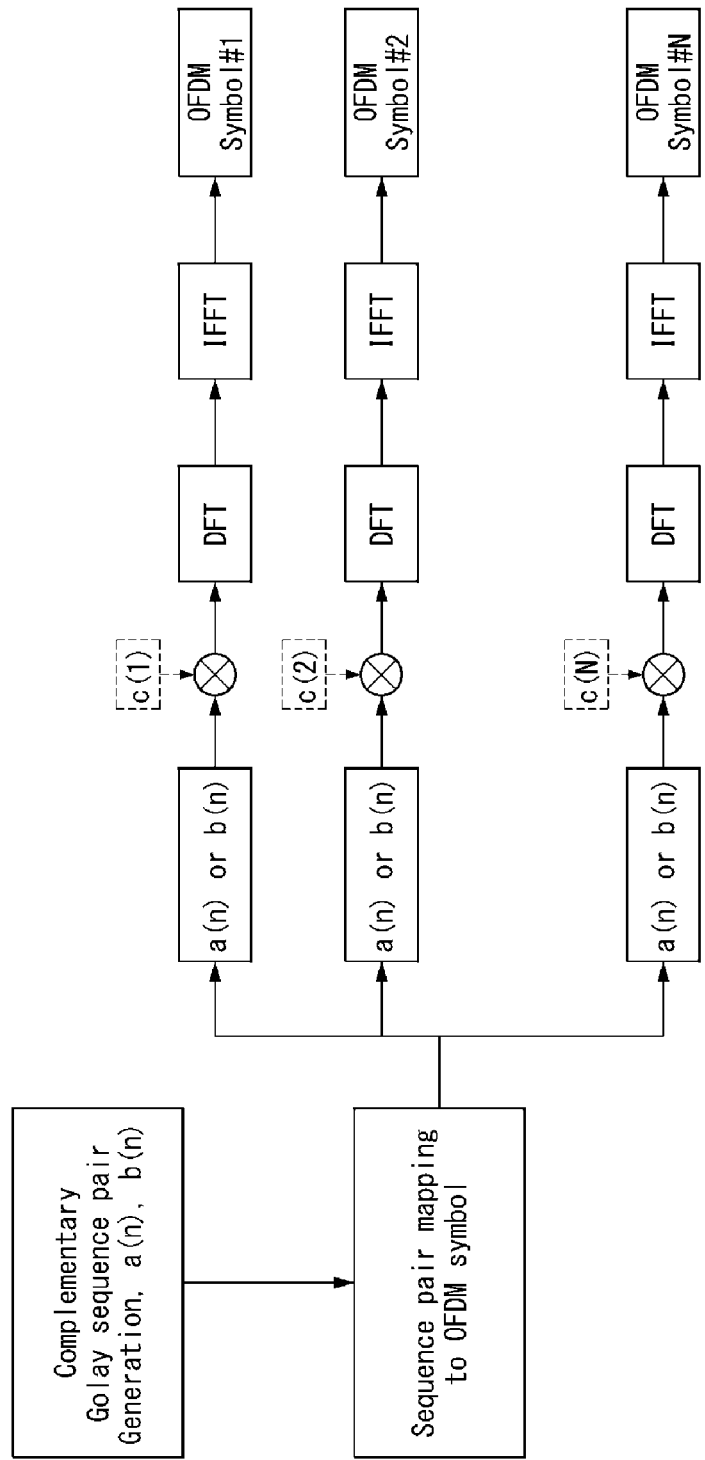
FIG. 15 illustrates an example of a method for implementing M-PSS to which the method proposed in the present disclosure can be applied.

FIG. 15 illustrates an example of a method for implementing M-PSS to which the method proposed in the present disclosure can be applied.

Particularly, FIG. 15 shows a method for generating an M-PSS using a complementary Golay sequence.

As shown in FIG. 15, using a complementary Golay sequence pair, a CGS that is going to be transmitted to each OFDM symbol is selected (i.e., select a(n) or b(n)).

Next, in the case of using a cover code, c(1) to c(N) may be multiplied to each CGS, and in the case of not using the cover code, 1 may be inputted to all of c(n).

Subsequently, the DFT and the IFFT are performed for each symbol, and transmitted to each OFDM symbol on time domain.

Additionally, the ZC sequence of length 12 may also generate a sequence that is going to be transmitted to each OFDM symbol.

In this case, by using the same method applied in FIG. 15, the M-PSS may be implemented.

Zadoff-Chu (ZC) Sequence

The ZC sequence may be determined according to Equation 18 below.

$$c(n) = e^{-\frac{j\pi u n(n+1)}{N}}, \quad n = \{0, 1, 2, \ldots, N - 1\} \quad \text{[Equation 18]}$$

Herein, N may represent a length of sequence and u may represent a root index of the ZC sequence.

In this case, the ZC sequence has a fixed size, and the side robe of the self correlation function of the ZC sequence may have a value nearly approximate to zero. That is, the ZC sequence may have the Constant Amplitude Zero Autocorrelation (CAZAC) property.

In addition, the ZC sequence may be useful for signal detection when the ZC sequence is used as a PSS signal.

For example, the correlation function R(n) of the frequency-shifted signal of the ZC sequence and the original signal may be given as a Dirac delta function of time-shifted. The frequency-shifted signal cf(n) of the ZC sequence as much as f0=k/N by a Doppler offset may be determined according to Equation 19 below.

$$c_f(n) = c(n)\exp(j2\pi f_o n) \quad \text{[Equation 19]}$$

In addition, the correlation function R(n) of frequency-shifted signal cf(n) and the original signal c(n) may be determined according to Equation 20 below.

$$R(a) = \sum_{n=0}^{N-1} c_f(n + a)c^*(n) \approx N \cdot \delta(k - ua) \quad \text{[Equation 20]}$$

In this case, when the frequency-shifted PSS signal is detected by an arbitrary Doppler offset, the signal detection is not required to be performed for all available Doppler offsets, and therefore, the complexity of the signal detection may be decreased.

Figure 16:
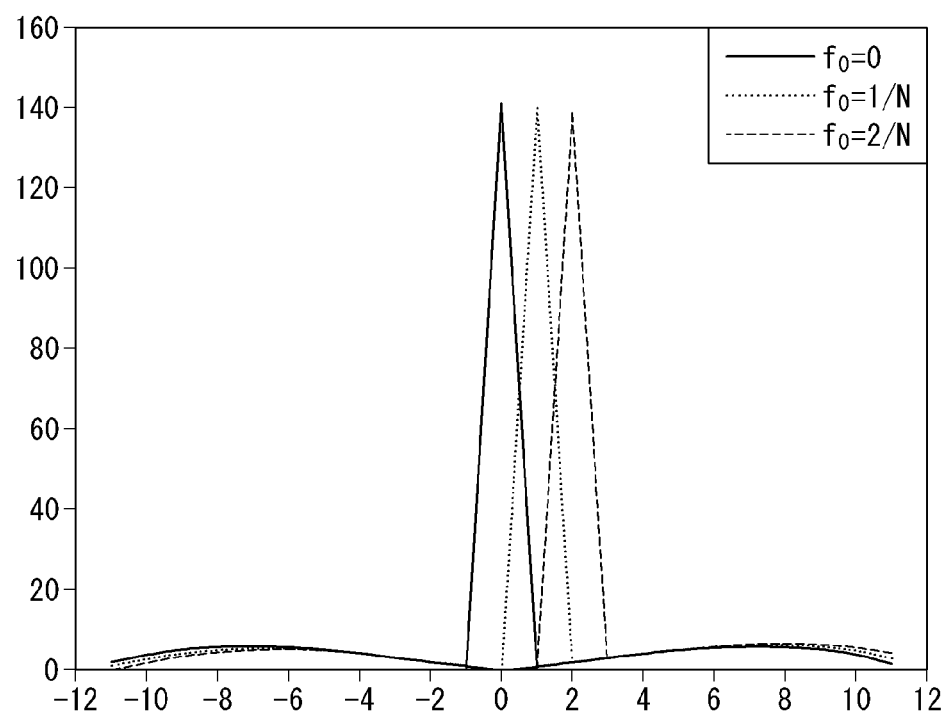
FIG. 16 illustrates an example of the correlation function of the ZC sequence following the frequency shift to which the method proposed in the present disclosure may be applied.

FIG. 16 illustrates an example of the correlation function of the ZC sequence following the frequency shift to which the method proposed in the present disclosure may be applied.

FIG. 16 shows the outputs of the correlation functions when the value of frequency shift f0 is 0, 1/N and 2/N. Herein, it is assumed that N is 141 and u is 1.

As another example, the phase difference of two samples that have an arbitrary time difference may have the property of linear phase increase of ua/N as represented in Equation 21 below. This may be the same for the case of the frequency-shifted signal cf(n).

$$c(n)c^*(n + a) = c_f(n)c_f^*(n + a) = e^{\frac{j\pi u(2an+a(a+1))}{N}} \quad \text{[Equation 21]}$$

In this case, the differential detection method may be used for detecting a PSS signal, and the signal may become a tone signal that has a frequency component of ua/N by performing the differential detection according to sample interval a.

Operation System of the NB LTE System

FIG. 16 illustrates an example of an operation system of the NB LTE system to which the method proposed in the present disclosure can be applied.

Particularly, FIG. 16(a) shows an In-band system, FIG. 16(b) shows a Guard-band system, and FIG. 16(c) shows a Stand-alone system.

The In-band system may be expressed by an In-band mode, the Guard-band system may be expressed by a Guard-band mode, and the Stand-alone system may be expressed by a Stand-alone mode.

The In-band system shown in FIG. 16(a) is referred to as a system or a mode in which a specific 1 RB in the legacy LTE band is used for the NB-LTE (or LTE-NB), and may be operated by allocating a part of the resource blocks of the LTE system carrier.

The Guard-band system shown in FIG. 16(b) is referred to as a system or a mode using NB-LTE in a reserved space for a guard band of the legacy LTE band, and may be operated by allocating a guard-band of LTE carrier not used for resource block in the LTE system.

The legacy LTE band has the guardband of minimum 100 kHz in the last part of each LTE band.

In order to use 200 kHz, two non-contiguous guardband may be used.

The In-band system and the Guard-band system represent the structure in which the NB-LTE is coexisted in the legacy LTE band.

On the contrary, the Stand-alone system shown in FIG. 16(c) is referred to as a system or a mode which is independently constructed from the legacy LTE band, and may be operated by separately allocating the frequency band (the GSM reallocated carrier later) used in GE RAN.

Figure 17:
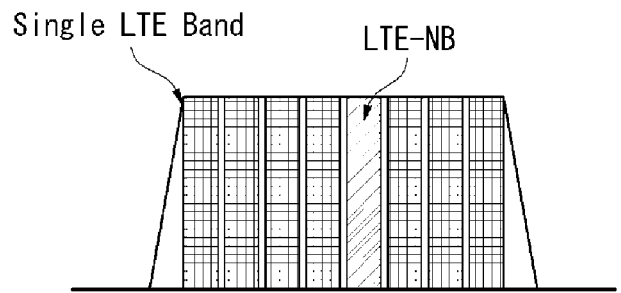
FIG. 17 illustrates an example of an operation system of the NB LTE system to which the method proposed in the present disclosure can be applied.
Figure 17:
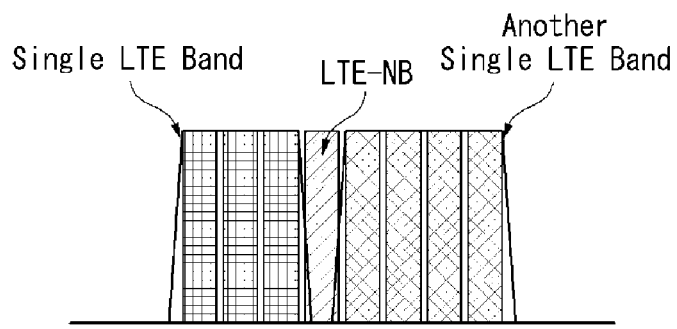
Figure 17:
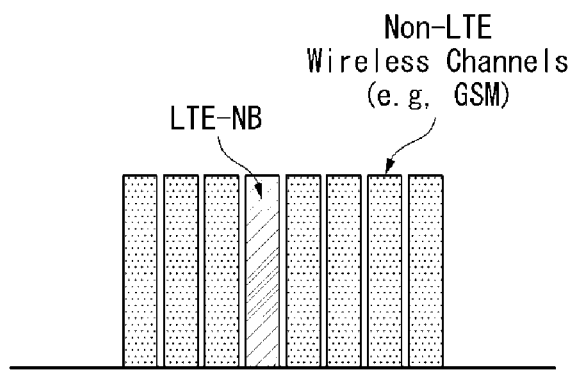

FIG. 17 illustrates an example of an NB-frame structure with respect to 15 kHz subcarrier spacing to which the method proposed in the present disclosure can be applied.

As shown in FIG. 17, it is shown that the NB-frame structure for the subcarrier spacing of 15 kHz is the same as the frame structure of the legacy system (LTE system).

That is, the NB-frame of 10 ms includes ten NB-subframes of 1 ms, and the NB-subframe of 1 ms includes two NB-slot of 0.5 ms.

Figure 18:
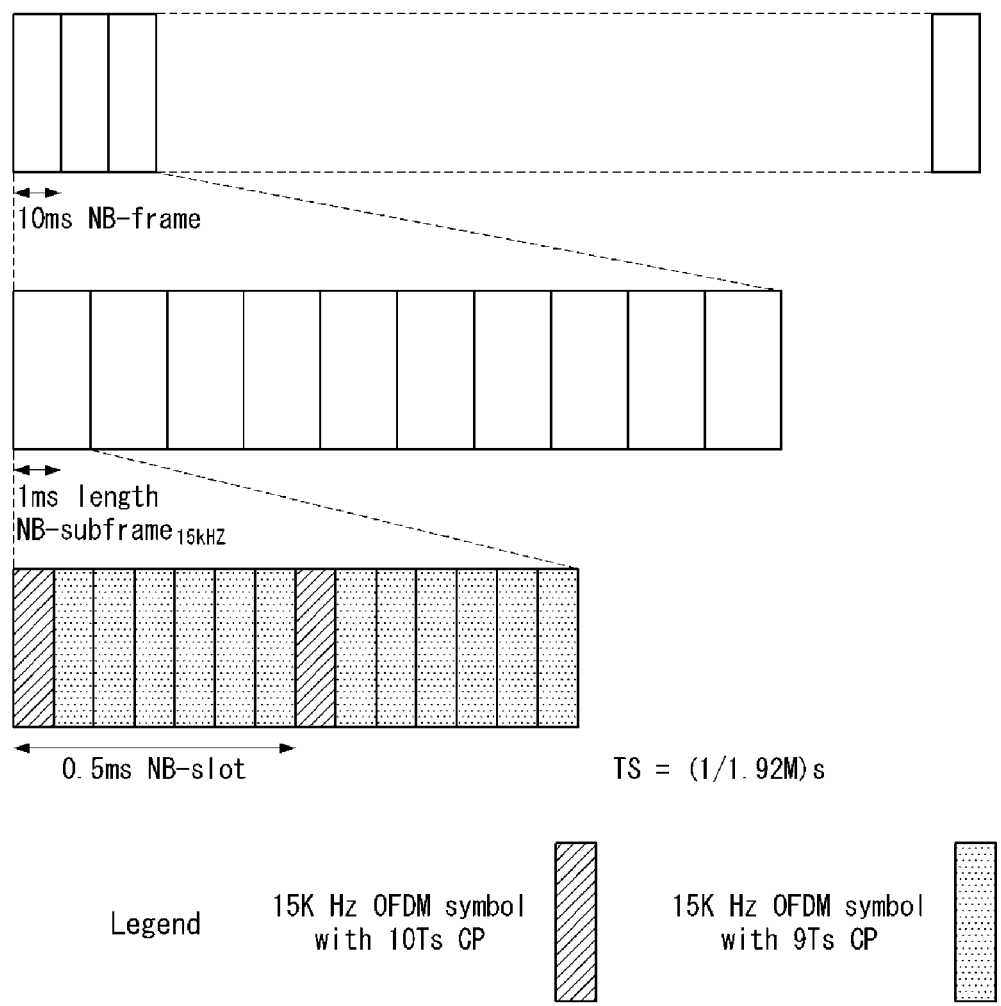
FIG. 18 illustrates an example of an NB-frame structure with respect to 15 kHz subcarrier spacing to which the method proposed in the present disclosure can be applied.

FIG. 18 illustrates an example of an NB-frame structure with respect to 3.75 kHz subcarrier spacing to which the method proposed in the present disclosure can be applied.

Referring to FIG. 18, the NB-frame of 10 ms includes five NB-subframes of 2 ms, and the NB-subframe of 2 ms includes seven OFDM symbols and a guard period (GP).

The NB-subframe of 2 ms may also be expressed by an NB-slot, an NB-resource unit (RU), or the like.

Figure 19:
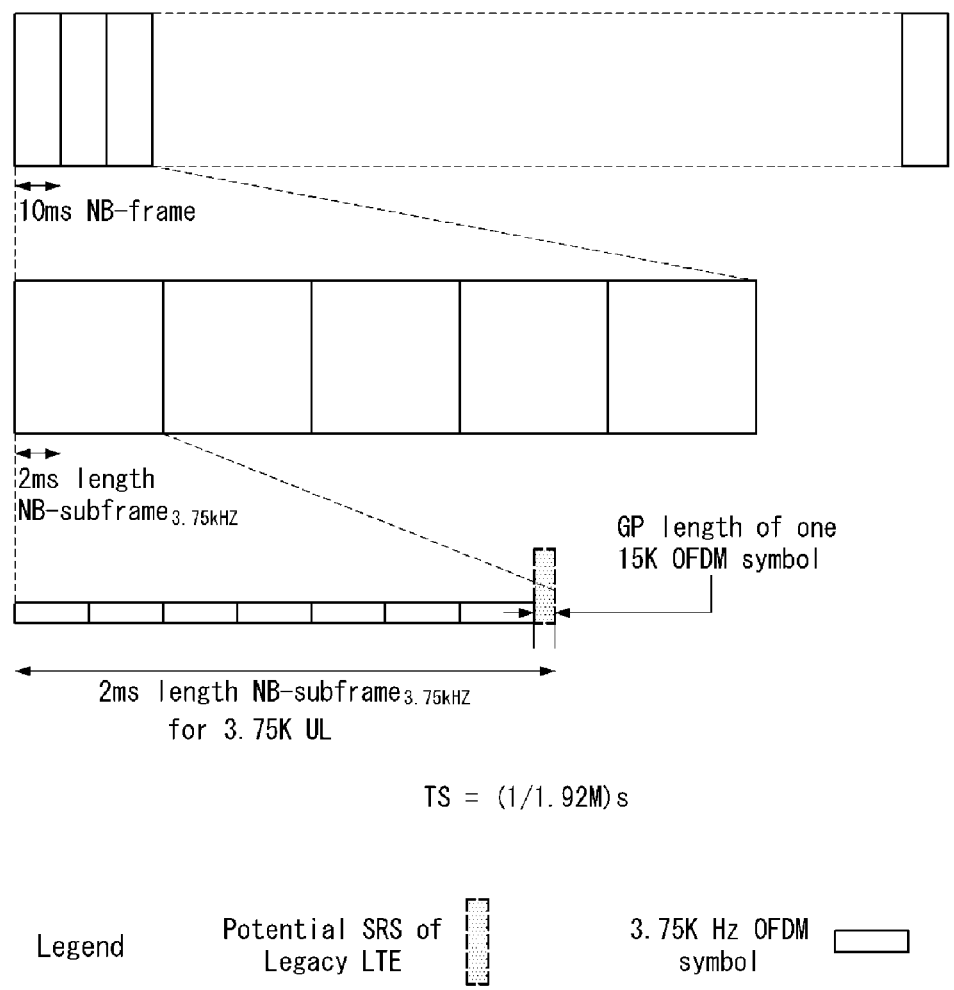
FIG. 19 illustrates an example of an NB-frame structure with respect to 3.75 kHz subcarrier spacing to which the method proposed in the present disclosure can be applied.
Figure 20:
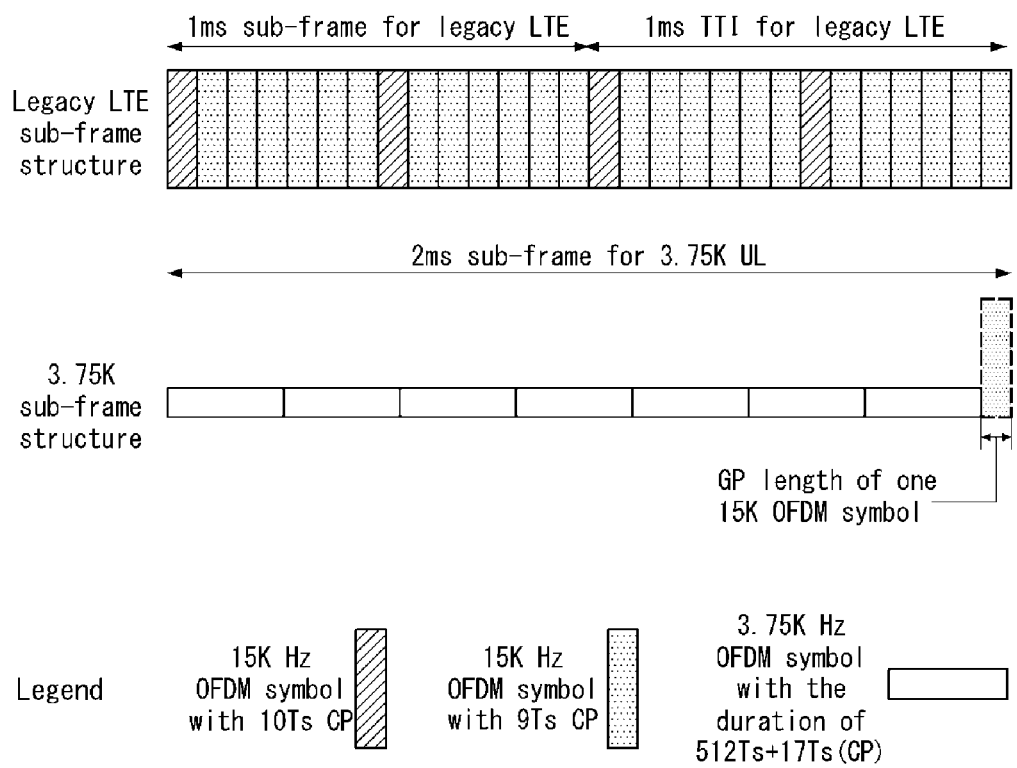
FIG. 20 illustrates an example of an NB subframe structure in 3.75 kHz subcarrier spacing to which the method proposed in the present disclosure can be applied.

FIG. 19 illustrates an example of an NB subframe structure in 3.75 kHz subcarrier spacing to which the method proposed in the present disclosure can be applied.

FIG. 19 illustrates the correspondence relation between the legacy LTE subframe structure and the subframe structure of 3.75 kHz.

Referring to FIG. 19, it is shown that the subframe (2 ms) of 3.75 kHz corresponds to two subframes of 1 ms (or TTI of 1 ms) of the legacy LTE.

Hereinafter, the enhanced receiver algorithm for an M-PSS proposed in the present disclosure will be described in detail.

As described above, the Narrowband (NB)-LTE is referred to as a system for supporting low complexity and low power consumption that have a system bandwidth (BW) corresponding to 1 Physical Resource Block (PRB).

That is, the NB-LTE system may be mainly used as a communication technique for implementing IoT by supporting a device (or a terminal) such as machine-type communication (MTC) in the cellular system.

In addition, in the NB-LTE system, it is not required to allocate additional bands for the NB-LTE system by using the OFDM parameters such as the subcarrier spacing, and the like, which are same used in the conventional LTE system.

That is, the NB-LTE system has an advantage of utilizing frequency efficiently by allocating 1 PRB of the legacy LTE system band to a NB-LTE use.

The physical channel in the NB-LTE system is expressed or called by adding M- in order to be distinguished from the physical channel of the LTE system.

That is, the physical downlink channel in the NB-LTE system may be defined as M-PSS/M-SSS, M-PBCH, M-PDCCH/M-EPDCCH, M-PDSCH, and the like.

Herein, the M- may have the similar meaning to N- (Narrowband).

Different from the terminal (user equipment; UE) of the legacy LTE system, a low specification is considered in the terminal of the NB-LTE system, and therefore, the frequency offset value that the terminal should overcome may be great (e.g., ±18 kHz).

In addition, it is preferable that the terminal of the NB-LTE system also performs the cell search process. Accordingly, since the channel raster value of the LTE system is defined as 100 kHz, in the case that the terminal aligns the legacy Physical Resource Block (PRB) boundary and the PRB boundary of the NB-LTE system, the frequency offset of ±7.5 kHz is additionally occurred.

Accordingly, the present invention proposes operational methods (or algorithms) of the receiver of low complexity that may be used in the case that the frequency offset, which is going to be estimated by a terminal is great (e.g., ±25 kHz).

The methods proposed in the present invention may also be applied to a stand-alone system and/or a guard-band system as well as an in-band system.

Here, the in-band system is referred to as the system to which an in-band mode is applied, and the in-band mode is referred to as a mode for supplying the NB-IoT service using a resource block in the LTE frequency band.

In addition, the guard-band system is referred to as the system to which a guard-band mode is applied, and the guard-band mode is referred to as a mode for supplying the NB-IoT service using a resource block which is not used in the guard-band defined in the LTE frequency band.

Further, the stand-alone system is referred to as the system to which a stand-alone mode is applied, and the stand-alone mode is referred to as a mode for supplying the NB-IoT service solely using the GSM frequency band for the purpose of a GSM service and the frequency band for the IoT service potentially.

In the subsequent description, for the convenience of description, 'the NB-LTE terminal and/or the terminal supporting the NB-LTE' may be referred to as 'a terminal'.

Receiver Algorithm of a Matched Filter Type

In order to perform an initial cell search in the NB-LTE system, a terminal is required to estimate accurate frequency and time using the received signal in which an M-PSS is included. In other words, a terminal may synchronize frequency and time using the signal in which the synchronization signal is included.

In this case, the terminal may perform a frequency compensation while swinging for the received signal in which an M-PSS is included with a predetermined frequency spacing within ±25 kHz.

Here, performing the frequency compensation while the terminal swings with a certain frequency interval may mean that the terminal performs the frequency compensation procedure sequentially by changing the frequency offset value according to the certain frequency interval.

Accordingly, the terminal may calculate the cross correlation values for all cases in the timing window which is expected using the received signal compensated with a specific frequency offset and a reference signal that the terminal knows in advance (or predefined).

Here, the predefined reference signal may mean a PSS (M-PSS or N-PSS) reference signal following the sequence predefined between a terminal and a BS. In addition, the expected timing window may mean a time duration when the terminal performs a cell search process. In other words, within the time duration when the terminal is going to estimate a frequency offset and a time offset, the terminal may all calculate the cross correlation values between the received signal compensated with a specific frequency offset and the predefined reference signal.

In this case, it is apparent that calculating the cross correlation values between the two signals (the received signal compensated with a specific frequency offset and the predefined reference signal) in the time domain may correspond to calculating the result of complex conjugate operation between the two signals in the frequency domain.

In addition, performing the frequency compensation while the terminal is swinging in the time domain may have an effect of performing cyclic shift with a predetermined interval in the frequency domain.

According to the procedure described above, the cross correlation values between the received signal and the reference signal for all frequency offset domains and the time domains may be calculated. Later, the terminal may determine the frequency offset value and the time offset value that have the greatest cross correlation value among the calculated cross correlation values. In this case, the determined frequency offset value and the time offset value may mean the values used for the frequency synchronization and the time synchronization.

Later, the terminal may use an NB-SSS (M-SSS or N-SSS) for detection using the determined frequency offset value and the time offset value.

Figure 21:
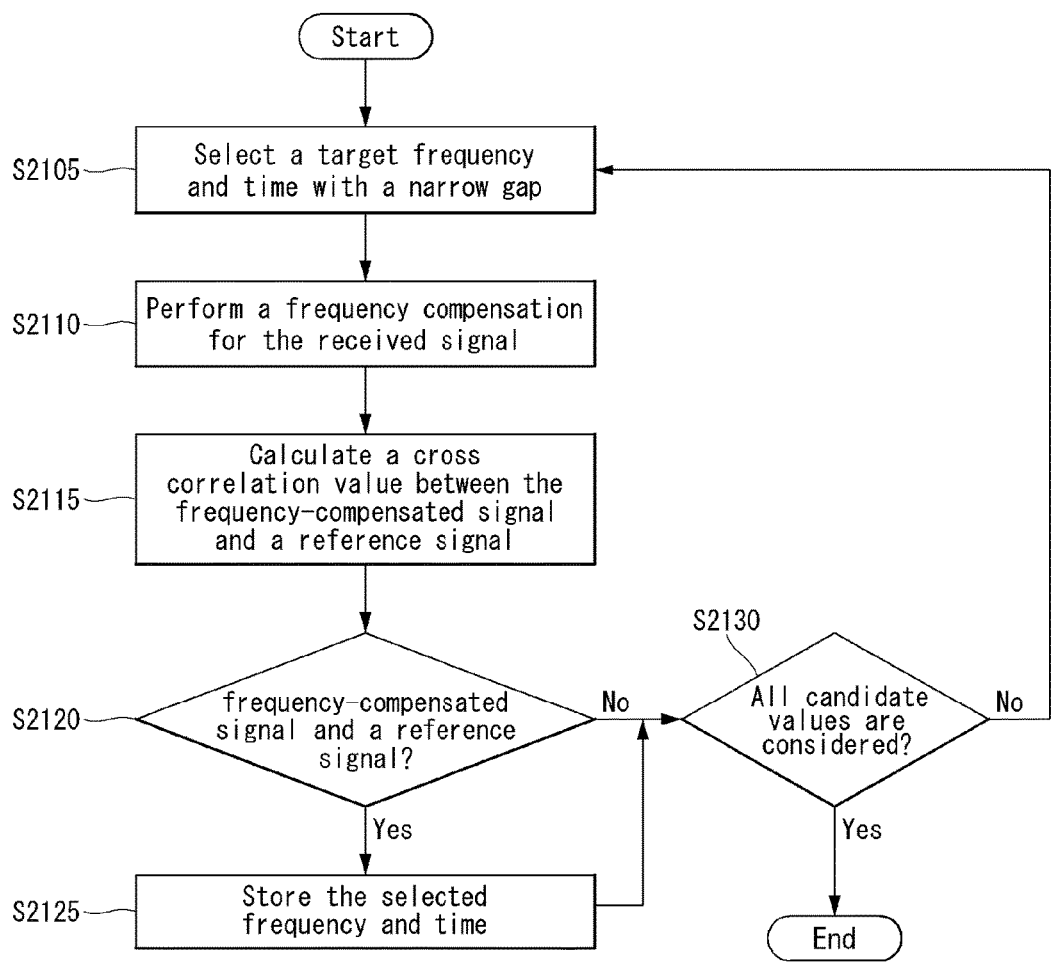
FIG. 21 illustrates an operational flowchart of a terminal that estimates a frequency offset and a time offset according to an embodiment of the present invention.

FIG. 21 illustrates an operational flowchart of a terminal that estimates a frequency offset and a time offset according to an embodiment of the present invention. FIG. 21 is shown only for the convenience of description, but not for limiting the scope of the present invention.

Referring to FIG. 21, the case is assumed that a terminal (initially) enters a cell, and performs a cell search process.

In step, S2105, a terminal selects a target frequency and time with a narrow gap. Here, the target frequency and time may mean the frequency offset value and the time offset value that are going to be applied to a received signal to calculate the cross correlation value with a reference signal for a primary synchronization signal (PSS).

In this case, the terminal may select one frequency offset value and one time offset value, respectively, among a plurality of frequency offset candidates and time offset candidates.

In addition, since the terminal selects the target frequency and time with a narrow gap, as a cyclic loop of the corresponding procedure (or the procedure shown in FIG. 21) is repeated, the terminal may select combinations of all available frequency and time.

After the terminal selects the target frequency and time, in step, S2110, the terminal performs a frequency compensation for the received signal. In this case, the terminal may perform the frequency compensation using the selected target frequency value.

In addition, the received signal means a signal that the terminal actually receives, and may include a PSS (M-PSS or N-PSS) and/or an SSS (M-SSS or N-SSS) transmitted from at least one cell.

After the terminal performs the frequency compensation, in step, S2115, the terminal calculates a cross correlation value between the frequency-compensated signal and a reference signal. In this case, the terminal may calculate the cross correlation value based on the target timing value selected in step, S2105.

Here, the reference signal may mean a reference signal for a PSS. The reference signal may be generated in the terminal based on a predefined rule (or scheme).

In other words, the terminal may calculate a peak value by cross-correlating the received signal which is frequency-compensated and the reference signal for the predefined PSS.

After the terminal calculates the cross correlation value, in step, S2120, the terminal determines whether the calculated cross correlation value is the maximum value. That is, the terminal may determine whether the calculated cross correlation value is the maximum value among the calculated values up to now.

In the case that the calculated cross correlation value is the maximum value, in step, S2125, the terminal stores the frequency value and the time value in step, S2105. Here, the stored frequency value (or frequency offset value) and the time value (or time offset value) may be used for synchronizing the frequency synchronization and the time synchronization for the cell.

On the contrary, in the case that the calculated cross correlation value is not the maximum value or after the terminal stores the frequency value and the time value in step, S2125, the terminal determines whether all candidate values are considered in step, S2130.

In other words, the terminal may determine whether the search process is completed according to the procedures described above for all frequency offset candidates and time offset candidates.

In the case that the terminal determines that all values are not considered, the terminal may return to step, S2105, and may perform the procedures after step, S2105 by selecting another candidate frequency and time value. Accordingly, the terminal may calculate the cross correlation values for the combinations of frequency and time for all cases within a specific time interval (or time window).

On the contrary, in the case that the terminal determines that all values are considered, the terminal may terminate the operation of estimating the frequency offset and time offset through the synchronization signal.

The method of estimating the frequency offset and time offset by considering the combinations of frequency and time for all cases described above has an effect of decreasing a frequency estimation error and a timing estimation error.

However, since the method considers all available cases, the complexity for the operation performed in the receiver of the terminal may be high.

Accordingly, the present invention proposes a method for decreasing the complexity for the operation performed in the receiver of the terminal.

The method described above uses a technique of searching a precise estimated frequency (or estimated frequency offset) and estimated time (or estimated time offset) simultaneously.

Different from this, in order to decrease the complexity of operation, a method may be considered for using a technique of determining an approximate estimated frequency first, and searching a precise estimated frequency using the determined estimated frequency.

For example, the predetermined frequency spacing which is a reference for the frequency compensation in the time domain may be configured as 10 times greater in comparison with the method described above. In other words, when the terminal performs the frequency compensation at 100 Hz interval in the method described above, the terminal may perform the frequency compensation at 1000 Hz interval in the method of determining an approximate estimated frequency first. As described above, performing the frequency compensation while swinging in the time domain may have an effect of performing cyclic shift (CS) with a predetermined interval in the frequency domain. Accordingly, when the predetermined frequency spacing for performing the frequency compensation in the time domain is configured as 10 times greater, the number of samples of the cyclic shift which is progressed in the frequency domain increases 10 times (e.g., when the cyclic shift is applied for each 8.5 samples in the method described above, the cyclic shift is applied for each about 85 samples in the method of determining an approximate estimated frequency first).

Accordingly, as the number of searching the frequency offset and the time offset in ±25 kHz band which is the range in which the frequency offset may be estimated (or the range that the whole frequency offset may include) becomes 0.1 times in comparison with the previous case, the complexity of receiver may be decreased.

In addition, in step, S2115 of FIG. 21, when the terminal performs a Fast Fourier Transform (FFT) operation for obtaining the cross correlation value, the terminal may perform the FFT operation by setting the size of FFT to be a great value (i.e., setting a sampling frequency to be a great value) to obtain (search) a precise estimated frequency value.

Different from this, since obtaining an approximate estimated frequency is the preferential object in the method of determining an approximate estimated frequency first, the terminal may perform the FFT operation for obtaining the cross correlation value by decreasing the FFT size (or setting a sampling frequency to be a small value).

Here, although the FFT size is described only, the method may be identically applied to the size of the Inverse Fast Fourier Transform (IFFT) used for the IFFT operation, which is an inverse operation of the FFT operation.

Accordingly, when the terminal calculates the cross correlation value, as the length of performing the FFT operation and/or the IFFT operation by the terminal is shortened, the complexity of receiver may be decreased.

In addition, in the case of the NB-LTE system, since all of M-PSSs (or N-PSSs) are transmitted within 1 RB (e.g., 180 kHz), valid information may be existed in the bandwidth of 180 kHz in the frequency domain after the FFT is progressed.

Accordingly, when the IFFT is taken by using the information located in the corresponding bandwidth (e.g., using a band-pass filter), there is an advantage of decreasing the calculation for the signal included in unnecessary bands.

Figure 22:
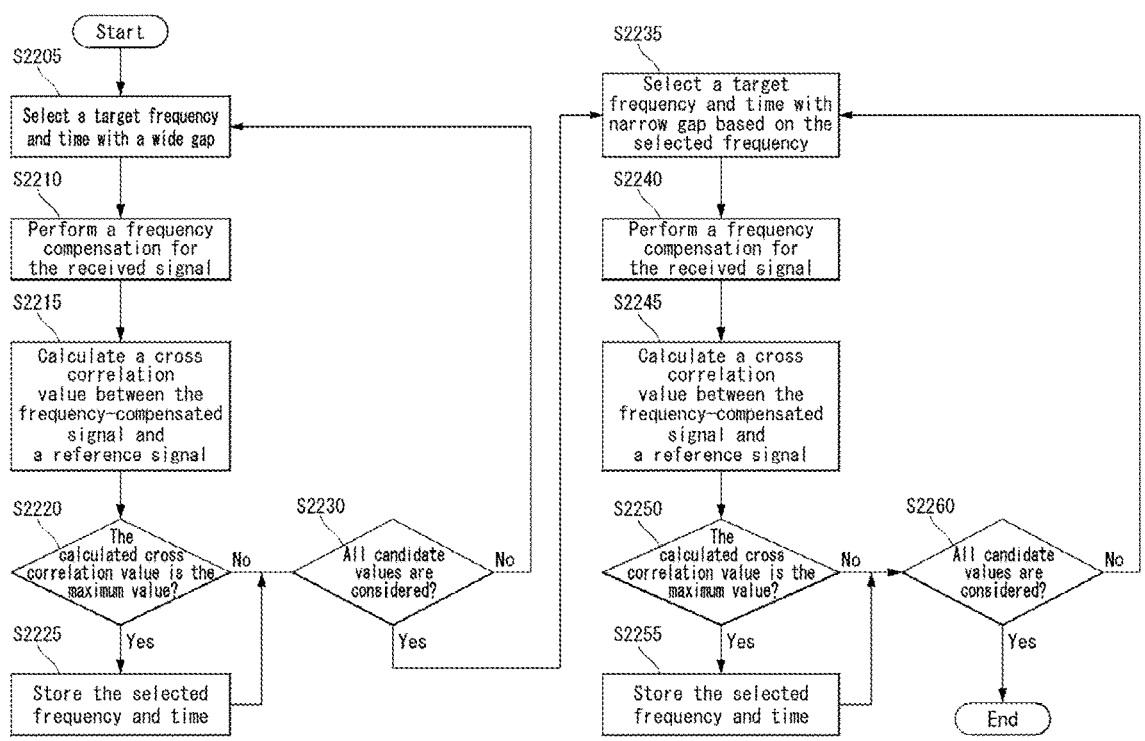
FIG. 22 illustrates an operational flowchart of a terminal that estimates a frequency offset and a time offset according to another embodiment of the present invention.

FIG. 22 illustrates an operational flowchart of a terminal that estimates a frequency offset and a time offset according to another embodiment of the present invention. FIG. 22 is shown only for the convenience of description, but not for limiting the scope of the present invention.

Referring to FIG. 22, the case is assumed that a terminal (initially or at the beginning) enters a cell, and performs a cell search process.

In step, S2205, a terminal selects a target frequency and time with a wide gap. Here, the target frequency and time may mean the frequency offset value and the time offset value that are going to be applied to a received signal for calculating the cross correlation value with a reference signal for a PSS.

In this case, the terminal may select one frequency offset value and one time offset value, respectively, among a plurality of frequency offset candidates and time offset candidates.

After the terminal selects the target frequency and time, in step, S2210, the terminal performs a frequency compensation for the received signal. In other words, the terminal may compensation a received signal using the frequency selected in step, S2205.

Here, the received signal means a signal that the terminal actually receives, and may include a PSS (M-PSS or N-PSS) and/or an SSS (M-SSS or N-SSS) transmitted from at least one cell.

After the terminal performs the frequency compensation for the received signal, in step, S2215, the terminal calculates a cross correlation value between the frequency-compensated signal and a reference signal.

In addition, in order to decrease the calculation complexity of a receiver, the terminal may perform the FFT and/or IFFT operation of which the length of the FFT and/or IFFT size is shortened in comparison with the operation of the terminal in step, S2115 of FIG. 22.

After the terminal calculates the cross correlation value, in step, S2220, the terminal determines whether the calculated cross correlation value is the maximum value. That is, the terminal may determine whether the calculated cross correlation value is the maximum value among the calculated values up to now.

In the case that the calculated cross correlation value is the maximum value, in step, S2225, the terminal stores the frequency value and the time value in step, S2205. Here, the stored frequency value may be an approximate estimated frequency offset value for the precise frequency offset estimation.

On the contrary, in the case that the calculated cross correlation value is not the maximum value or after the terminal stores the frequency value and the time value in step, S2225, the terminal determines whether all candidate values are considered in step, S2230. Here, the all candidate values may mean the candidate values based on the frequency selected with wide gap.

In the case that the terminal determines that all values are not considered, the terminal may return to step, S2205, and may repeatedly perform the procedures after step, S2205 by selecting another candidate frequency and time value.

On the contrary, in the case that the terminal determines that all values are considered (or after the approximate frequency offset value is determined), in step, S2235, the terminal may select a target frequency and time with narrow gap based on the selected (determined or stored) frequency. Here, the selected target frequency and time may mean the frequency offset and the time offset value that are going to be applied to the received signal to calculate the cross correlation value with respect to the reference signal for a PSS.

In this case, the terminal selects the target frequency and time with narrow gap, as the cyclic shift of the corresponding procedure (or the procedure shown in FIG. 22) is repeated, and accordingly, the terminal is able to search the frequency offset candidates and the time offset candidates based on the selected frequency.

Later, in step, S2240, the terminal may perform the frequency compensation for the received signal. In this case, since the operation of the terminal in step, S2240 is similar to the operation of the terminal in step, S2110 shown in FIG. 21 described above, the detailed description will be omitted.

After the terminal performs the frequency compensation, in step, S2245, the terminal may calculate the cross correlation value between the compensated signal and a reference signal. In this case, since the operation of the terminal in step, S2245 is similar to the operation of the terminal in step, S2215 described above, the detailed description will be omitted.

In addition, since the operations of the terminal in steps, S2250, S2255 and S2260 are similar to the operation of the terminal in steps, S2120, S2125 and S2130 shown in FIG. 21 described above, the detailed description will be omitted.

In other words, after the terminal calculates the cross correlation value in step, S2245, the terminal determines whether the calculated value is the maximum value. Accordingly, in the case that the calculated value is the maximum value, the terminal stores the selected frequency and time. And, in the case that the terminal determines that all combinations of frequency and time are considered according to the selected frequency in the procedure described above, the terminal may terminate the procedure.

Consequently, in order to estimate the frequency offset and the time offset using a synchronization signal (e.g., PSS), the terminal may perform the operation of the first step (step 1) for determining an approximate frequency offset and the second step (step 2) for estimating the precise frequency offset and the time offset based on the approximate frequency offset.

As the terminal performs the first step and the second step sequentially, the complexity of calculation at the receiver may be decreased in comparison with the procedure shown in FIG. 21.

More particularly, in the case that there exist each of the 100 candidates of the time value and the frequency value, the receiver that performs the procedure shown in FIG. 21 performs 10000 times algorithm loop, and accordingly, the estimated frequency offset and the estimated time offset may be determined.

On the other hand, the receiver that performs the procedure shown in FIG. 22 performs the algorithm loop 10 times for the candidates of 10 frequency values (i.e., assuming that the frequency interval of 10 times greater is used) (the first step). Later, the terminal may determine the estimated frequency offset and the estimated time offset by performing the algorithm loop total 1000 times for the candidates of 10 frequency values and the candidates of 100 time values that are existed neighboring the candidate of selected frequency value among them (the second step). Additionally, the method of decreasing the size of FFT and/or IFFT is applied in the step of the terminal calculating the cross correlation (step, S2215 and/or step, S2245), and the method of utilizing the information required in the frequency domain is applied, and accordingly, the scheme of lower receiver complexity may be implemented.

Figure 23:
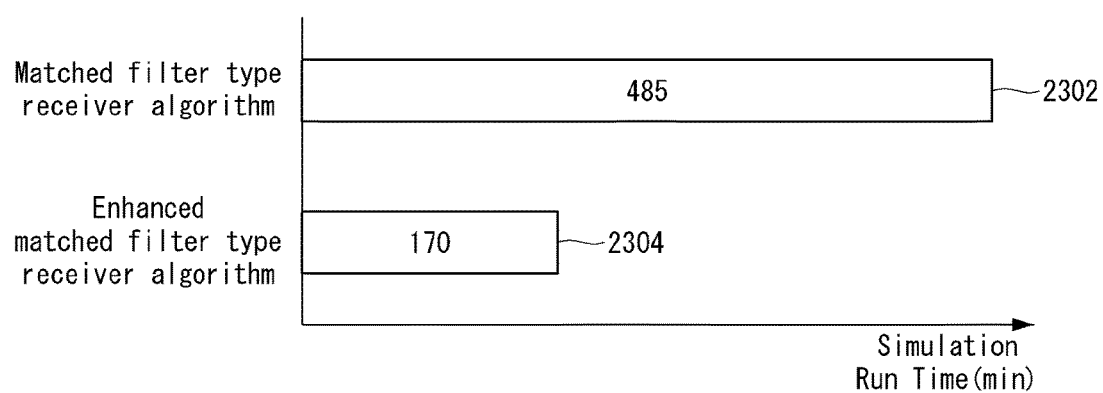
FIG. 23 illustrates a simulation run time for the methods for estimating the frequency offset and the time offset according to the various embodiments of the present invention.

The graph in relation to the simulation run time of the case of using the method shown in FIG. 21 (or matched filter type receiver algorithm) or the case of using the method shown in FIG. 22 (or enhanced matched filter type receiver algorithm) is as shown in FIG. 23.

FIG. 23 illustrates a simulation run time for the methods for estimating the frequency offset and the time offset according to the various embodiments of the present invention. FIG. 23 is shown only for the convenience of description, but does not limit the scope of the present invention.

Referring to FIG. 23, the case is assumed that the predetermined frequency gap configured for determining an approximate frequency of the method shown in FIG. 22 is four times the case of the method shown in FIG. 21.

Run time 2302 represents the time required when a terminal estimates the frequency offset and the time offset based on a synchronization signal in the case that the method shown in FIG. 21 is used. In this case, total required time is measured about 485 minutes.

On the contrary, run time 2304 represents the time required when a terminal estimates the frequency offset and the time offset based on a synchronization signal in the case that the method shown in FIG. 22 is used. In this case, total required time of about 170 minutes is measured.

In view of the fact that the run time for the initial (or at the beginning) vector allocation operation and the operation in relation to the secondary synchronization signal (SSS) detection is constant, although the total run time is decreased to be ¼ accurately, it is identified that the run time is decreased correspondingly through the graph shown in FIG. 23.

Receiver Algorithm of Symbol-Level Differential Type

Using the receiver algorithm of the matched filter type described above, a terminal may determine an approximate frequency offset value first, and then, estimate precise frequency offset value and time offset value.

Different from it, using a symbol-level differentiation, a terminal may determine a precise time offset first irrespective of the frequency offset value, and then, estimate (or determine) precise frequency offset value.

When a terminal performs the symbol-level differentiation for a received signal, a constant phase difference and a time offset value are remained between each of symbols. In addition, when a terminal performs the symbol-level differentiation for a predefined reference signal (e.g., original M-PSS sequence) in the similar method, only a constant phase difference are remained between each of symbols.

Figure 24:
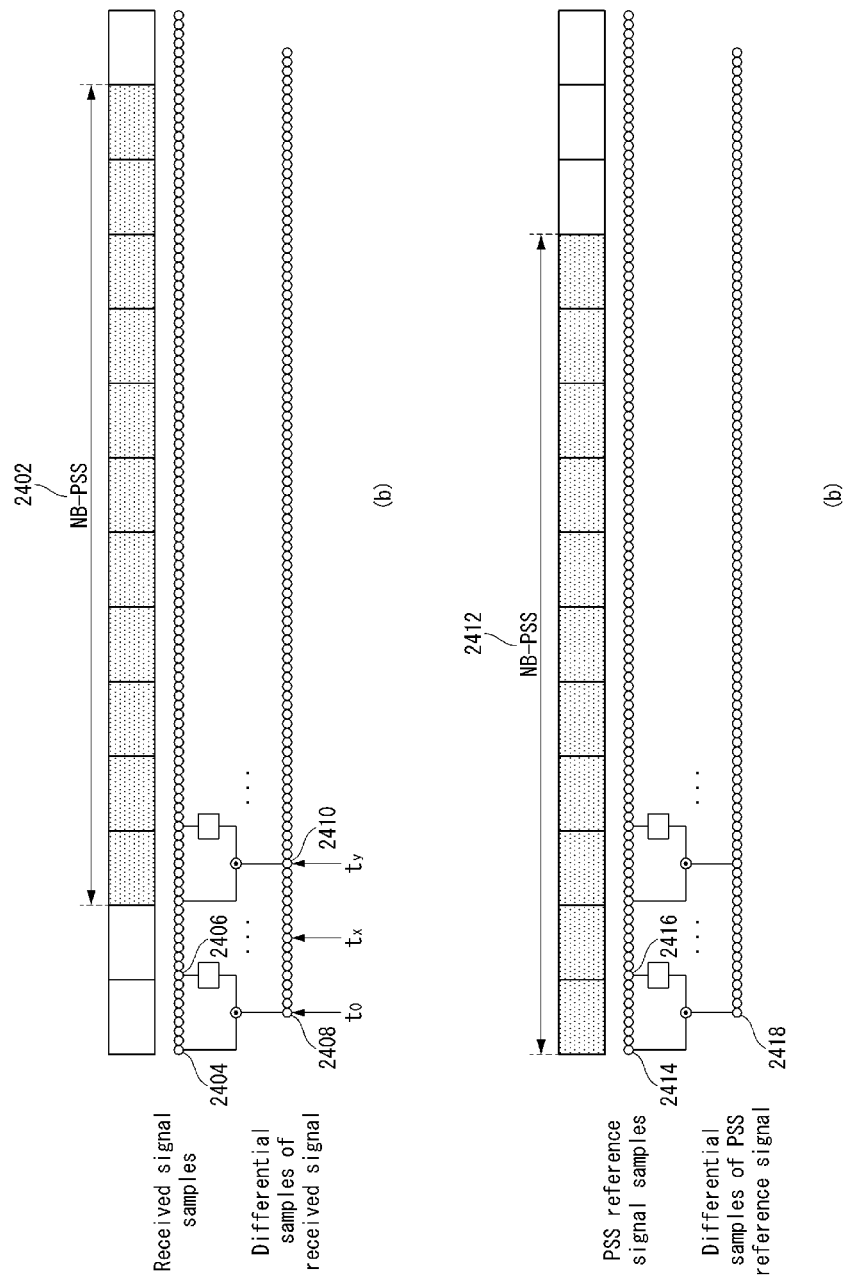
FIG. 24 illustrates a method of performing a symbol-level differentiation for a received signal and a predefined reference signal according to another embodiment of the present invention.

The method of performing the symbol-level differentiation for the received signal and the predefined reference signal is shown in FIG. 24.

FIG. 24 illustrates a method of performing a symbol-level differentiation for a received signal and a predefined reference signal according to another embodiment of the present invention. FIG. 24 is shown only for the convenience of description, but does not limit the scope of the present invention.

Referring to FIG. 24, the case is assumed that the time offset between the signal received in a terminal and the predefined reference signal is 2 OFDM symbols. In FIG. 24, a square may mean an OFDM symbol, and a circle may mean a sample which is sampled.

FIG. 24(a) shows the symbol-level differentiation for the signal received in the terminal, and FIG. 24(b) shows the symbol-level differentiation for the reference signal (or PSS (or M-PSS) reference signal) with respect to the PSS (or M-PSS) predefined between the terminal and a BS.

Here, the region 2402 means the region in relation to a transmission of M-PSS (N-PSS or NB-PSS) in the received signal, and the region 2412 means the region in relation to a transmission of M-PSS (N-PSS or NB-PSS) in the reference signal for the predefined PSS.

As shown in FIG. 24(a), the terminal may determine the samples of the received signal by performing sampling for the received signal.

When the samples of the received signal are determined, the terminal may acquire a first differentiation sample 2408 by performing a differentiation (differential or conjugate complex operation) between the first sample 2404 and the sample 2410 corresponding to different OFDM symbol of the signal received in the time domain.

Later, the terminal may acquire the differential samples of the received signal by repeatedly performing the same procedure for the next samples.

In addition, as shown in FIG. 24(b), the terminal may determine the samples of the reference signal for the PSS by performing sampling for the PSS reference signal.

When the samples of the PSS reference signal are determined, the terminal may acquire a first differentiation sample 2418 by performing a differentiation (differential or conjugate complex operation) between the first sample 2414 and the sample 2416 corresponding to different OFDM symbol in the time domain.

Later, the terminal may acquire the differential samples of the PSS reference signal by repeatedly performing the same procedure for the next samples.

After acquiring the differential samples for the received signal and the PSS reference signal, the terminal calculates the cross correlation value of differential samples of the PSS reference signal by moving through the differential samples of the received signal by each sample.

In the case of FIG. 24, when the terminal calculates the cross correlation value of differential samples of the PSS reference signal by moving through the differential samples of the received signal by each sample from t0, the terminal may acquire the greatest peak value at ty.

Accordingly, the terminal may determine ty value to be a time offset (i.e., time delay). In other words, as the terminal performs the cross correlation calculation using two differential samples, the terminal may determine (or calculate) the time offset value irrespective of the frequency offset value.

According to the method using the time-level differentiation, since the terminal performs the search operation only in the expected (or determined) time offset range, there is an advantage of obtaining the gain as much as about a half in comparison with the receiver of the matched filter type described above.

Figure 25:
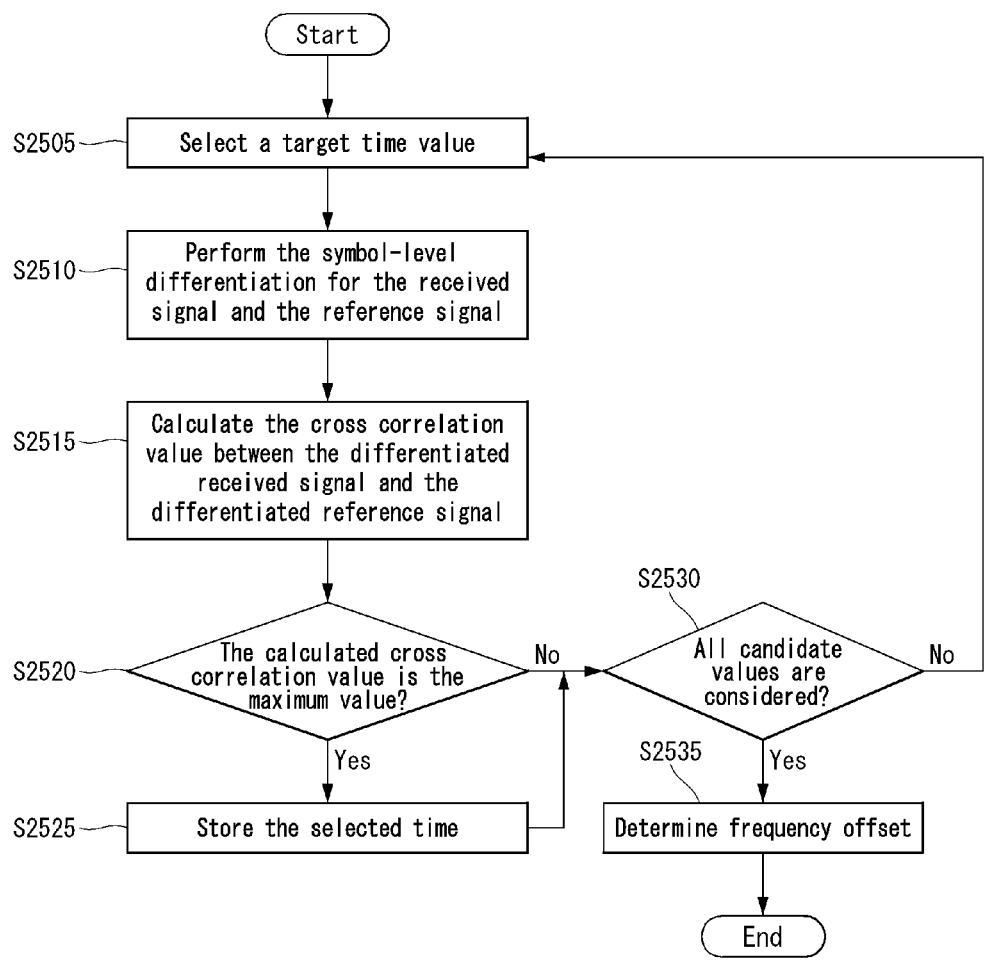
FIG. 25 illustrates an operational flowchart of a terminal that estimates a frequency offset and a time offset according to another embodiment of the present invention.

The detailed operations of the terminal with respect to the method for estimating the frequency offset and the time offset using the symbol-level differentiation is shown in FIG. 25.

FIG. 25 illustrates an operational flowchart of a terminal that estimates a frequency offset and a time offset according to another embodiment of the present invention. FIG. 25 is shown only for the convenience of description, but not for limiting the scope of the present invention.

Referring to FIG. 25, the case is assumed that a terminal (initially or at the beginning) enters a cell, and performs a cell search process.

In step, S2505, a terminal selects a target time value (or target time offset) among the candidates of a plurality of time values (or time offset candidates)

After the terminal selects the target time value, in step, S2510, the terminal performs (or applies) the symbol-level differentiation for the received signal and the PSS reference signal.

Here, the received signal means the signal that the terminal actually receives from a BS, and may include the PSS (M-PSS or N-PSS) and/or SSS (M-SSS or N-SSS) transmitted from at least one cell. In addition, the PSS reference signal may mean the reference signal for the PSS which is predefined between the terminal and the BS.

In this case, the terminal may perform the symbol-level differentiation for the received signal and the PSS reference signal through the procedure described in FIG. 24. In this case, since the signal of the time domain is constructed by the length as much as the summation of the FFT size and the cyclic prefix (CP) size for each OFDM symbol, the terminal may perform differentiation for each time sample of each OFDM symbol.

After the terminal performs the symbol-level differentiation for two signals, in step, S2515, the terminal calculates the cross correlation value between the differentiated received signal and the differentiated PSS reference signal.

In other words, the peak value may be calculated by performing the cross correlation calculation between the received signal to which the symbol-level differentiation is applied and the PSS reference signal to which the symbol-level differentiation.

In this case, the terminal may calculate the cross correlation value between the differentiated received signal (or differential samples of the received signal) and the differentiated PSS reference signal (or differential samples of the PSS reference signal) through the procedure described in FIG. 24.

After the terminal calculates the cross correlation value, in step, S2520, the terminal determines whether the calculated cross correlation value is the maximum value. That is, the terminal may determine whether the calculated cross correlation value is the maximum value among the calculated values up to now.

In the case that the calculated cross correlation value is the maximum value, in step, S2525, the terminal stores the time value selected in step, S2505. For example, in the case of FIG. 24, since the cross correlation value at ty is the maximum, the terminal may store ty as the precise time offset estimation value.

On the contrary, in the case that the calculated cross correlation value is not the maximum value or after the terminal stores the time value in step, S2525, in step, S2530, the terminal determines whether all candidate values are considered.

In other words, the terminal may determine whether the search process according to the procedures described above is completed for all time offset candidates.

In the case that the terminal determines that all values are not considered, the terminal may return to step, S2505, and perform the procedures after step, S2505 by selecting different time value (or time offset). Accordingly, the terminal may complete the search procedures for all time offset candidates.

On the contrary, in the case that the terminal determines that all values are considered, in step, S2535, the terminal determines the frequency offset based on the determined (or estimated) time offset.

More particularly, the terminal may perform the time compensation for the received signal using the determined time offset value, and perform the conjugated multiplexing calculation in the time domain for the compensated received signal and the PSS reference signal. Later, the terminal may determine the frequency index value that represents the power peak value of the sequence on the frequency domain by performing the FFT operation in the frequency domain for the calculated result value(s).

As described above, since the correlation function R(n) of the frequency-shifted signal and the original signal of the ZC sequence is given by the time-shifted Dirac delta function, the terminal may determine (or estimate) the frequency offset value which is applied to the received signal. In other words, the terminal may calculate a specific delta function by performing the cross correlation function between the received signal that is compensated based on the estimated time offset and the PSS reference signal, and may determine the frequency offset value using the calculated specific delta function.

As described above, after the terminal determines the time offset estimation value for the received signal that includes a synchronization signal using the symbol-level differentiation, the terminal may determine the frequency offset estimation value based on the time offset estimation value.

In this case, since the terminal does not perform the search for all combinations of the frequency offset and the time offset, the complexity at the receiver of the terminal may be decreased.

In more particular, initially, 11 M-PSS sequences of 12-length are transmitted through 11 OFDM symbols, respectively. In this case, the M-PSS sequences transmitted through the respective OFDM symbols may be identically constructed or differently constructed, or may be constructed with a repeated pattern for every specific symbol.

That is, since the detection performance of the M-PSS is determined depending on the array of the M-PSS sequence, any combinations of the sequences may be available. In this case, the sequence of 12-length which is used may be the Zadoff-Chu (ZC) sequence or the Complementary Golay Sequence (CGS).

In addition, a cover code may be added to each symbol. In the case that a transmitter Tx of a BS performs the IFFT after performing the FFT with a specific size (e.g., 125) and inserting a CP, the M-PSS included in the received signal may be transmitted as the samples of a specific size (e.g., 137 or 138) for each OFDM symbol.

For this, the terminal (or NB-LTE terminal) may perform differentiation of each OFDM symbol for the received signal, and with the similar method, the terminal may perform differentiation of each OFDM symbol for pre-defined reference signal (e.g., predefined PSS reference signal). Here, like the original M-PSS, the predefined reference signal may include the samples of a specific size (e.g., 137 or 138) for each OFDM symbol formed by performing the IFFT after performing the FFT with a specific size (e.g., 128) and inserting a CP, after constructing 11 sequences of 12-length with the ZC sequence or the CGS.

Through the differentiation (or symbol-level differentiation) for the received signal and the predefined reference signal, the terminal may acquire two differentiated sequences, and may perform the cross correlation calculation between two differentiated sequences.

As described above, after calculating the cross correlation value between the symbol-level differential sequence of the received signal and the symbol-level differential sequence of the PSS reference signal for all time offset domains, the terminal may estimate (or determine) the time offset candidate that has the greatest cross correlation value to be the time offset.

In addition, the terminal may estimate (or determine) the frequency offset value by performing the conjugated multiplexing calculation in the time domain based on the estimated time offset value. Using the estimated time offset value and the frequency offset value, the terminal may detect an NB-SSS (M-SSS or N-SSS).

Furthermore, in the case that a cover code is added from the time of the M-PSS being implemented initially (or from the beginning), the terminal may also calculate the cross correlation value by performing the symbol-level differentiation for the cover code instead of performing the symbol-level differentiation for the PSS (or M-PSS) reference signal.

Improved Cover Code Design for M-PSS Transmission

Generally, the M-PSS is transmitted using a plurality of symbols (e.g., OFDM symbols).

In this case, the sequence transmitted to the symbols may be configured such that the same sequence is repeatedly transmitted to each symbol, or may be configured based on different two sequences or three or more sequences different from each other arranged to be transmitted according to a predefined rule (or law).

In addition, when a BS (base station) transmits an M-PSS, a specific cover code (e.g., cover sequence) may be multiplied to each symbol which is used for transmitting the M-PSS.

In the case that the specific cover code (or code cover) is multiplied to each of the symbols, the correlation property of a signal may be improved. For example, when a terminal obtains the correlation value between the received signal in which the cover code is multiplied to each symbol and a reference signal, the peak value among the correlation values may be more clearly expressed.

In addition, as the specific cover code is transmitted with being multiplied to each of the symbols, the multiplexing between an M-PSS and/or terminals may be performed.

Furthermore, in addition to the improvement of the correlation property and the multiplexing effect, when the specific cover code is multiplied to each of the symbols, a BS may transmit additional information (e.g., subframe index, frame structure type, etc.) to a terminal using the sequence transmitted through the cover code.

In an embodiment of the present invention, the cover code may be configured by using a binary sequence including +1 or −1.

In this case, the BS may transmit the additional information by transmitting an M-PSS using different binary sequences.

For example, in the system (or environment) in which a normal cyclic prefix (CP) is considered, a BS may transmit an M-PSS using 11 OFDM symbols. Accordingly, the cover code for the M-PSS transmission may be configured as (or include) the binary sequence of length 11.

In this case, the BS may select two or more binary sequences of which correlation performance is the same but the sequence configuration (the shape of sequence or the values configuring the sequence) are different from each other in order to transmit the M-PSS. In this case, among the selected sequences, the binary sequence which is predefined (corresponding to specific information) between the terminal and the BS may be used for transmitting (or forwarding) the additional information.

As another example, in the system (or environment) in which an extended CP is considered, a BS may transmit an M-PSS using 9 OFDM symbols. Accordingly, the cover code for the M-PSS transmission may be configured as the binary sequence of length 9.

Like the example described above, even in this case, the BS may select two or more binary sequences of which correlation performance is the same but the sequence configuration (the shape of sequence or the values configuring the sequence) are different from each other in order to transmit the M-PSS. In this case, among the selected sequences, the binary sequence which is predefined (corresponding to specific information) between the terminal and the BS may be used for transmitting (or forwarding) the additional information.

In addition, in another embodiment of the present invention, the cover code described above may be configured by using the Zadoff-Chu (ZC) sequence.

In this case, the BS may transmit the additional information by transmitting the M-PSS using the ZC sequence that corresponds to the value of different root indexes.

For example, in the system in which a normal CP is considered, a BS may transmit an M-PSS using 11 OFDM symbols. Accordingly, the cover code for the M-PSS transmission may be configured as (or include) the binary sequence of length 11.

In this case, the ZC sequence of length 11 may be configured as the ZC sequence generated with length 11 initially. Different from this, in the case that the ZC sequence initially generated is greater than length 11, the ZC sequence of length 11 may be configured through the puncturing method so as to be matched to length 11. In addition, in the case that the ZC sequence initially generated is smaller than length 11, the ZC sequence of length 11 may be configured through the cyclic insertion method that a predetermined sequence is periodically inserted so as to be matched to length 11.

In this case, the root index value used for transmitting the additional information may be configured as the predefined (corresponding to specific information) between the terminal and the BS by considering the length of the ZC sequence which is initially (or at the beginning) generated.

As another example, in the system in which an extended CP is considered, a BS may transmit an M-PSS using 9 OFDM symbols. Accordingly, the cover code for the M-PSS transmission may be configured as (or include) the binary sequence of length 9.

In this case, the ZC sequence of length 9 may be configured as the ZC sequence generated with length 9 initially. Different from this, in the case that the ZC sequence initially generated is greater than length 9, the ZC sequence of length 9 may be configured through the puncturing method so as to be matched to length 9. In addition, in the case that the ZC sequence initially generated is smaller than length 9, the ZC sequence of length 9 may be configured through the cyclic insertion method that a predetermined sequence is periodically inserted so as to be matched to length 9.

In this case, the root index value used for transmitting the additional information may be configured as the predefined (corresponding to specific information) between the terminal and the BS by considering the length of the ZC sequence which is initially generated.

Figure 26:
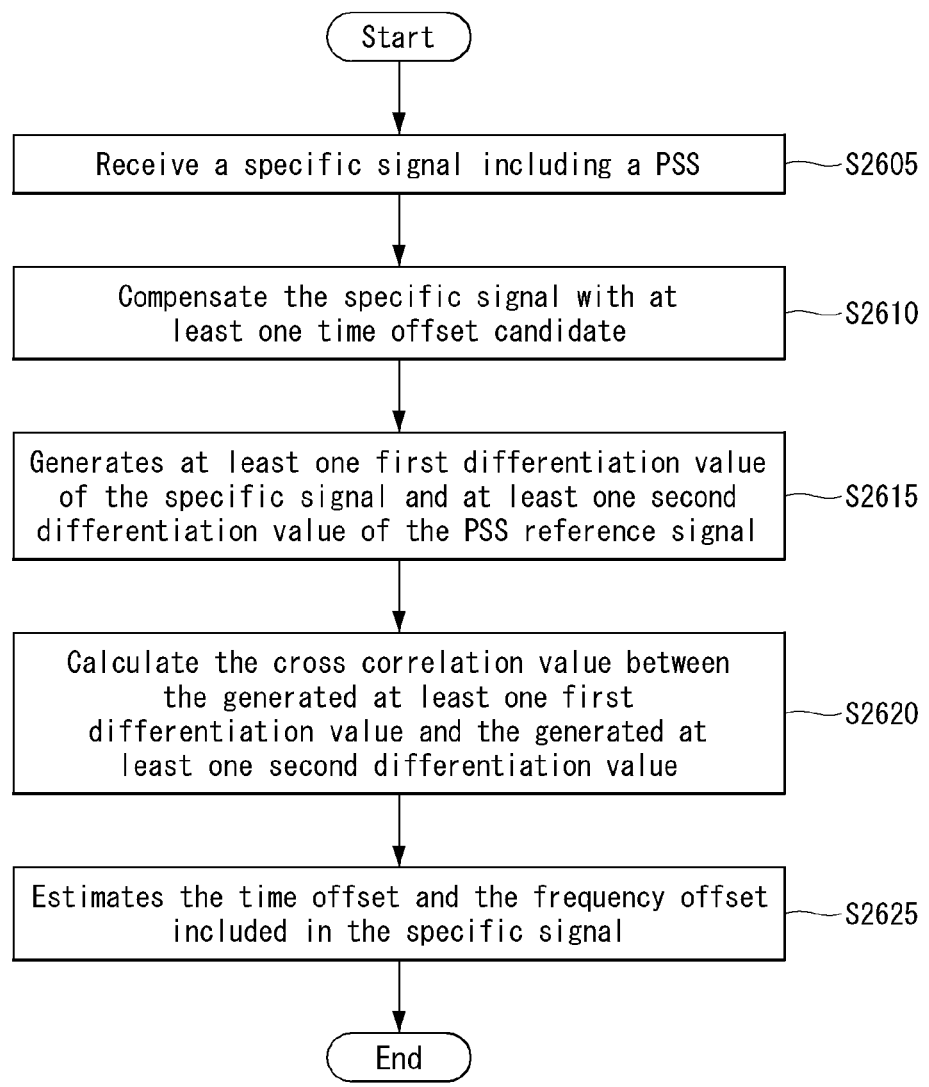
FIG. 26 illustrates an operational flowchart of a terminal for synchronizing frequency and time using a synchronization signal according to an embodiment of the present invention.

FIG. 26 illustrates an operational flowchart of a terminal for synchronizing frequency and time using a synchronization signal according to an embodiment of the present invention. FIG. 26 is shown only for the convenience of description, but not for limiting the scope of the present invention.

Referring to FIG. 26, the case is assumed that a terminal (initially or at the beginning) enters a cell, and performs a cell search process. In addition, the operation of the terminal described in FIG. 26 may be similar to the operation of the terminal described in FIG. 25. Furthermore, the PSS described in FIG. 26 may mean the M-PSS, the N-PSS, or the NB-PSS, and the SSS described in FIG. 26 may mean the M-SSS, the N-SSS, or the NB-SSS.

In step, S2605, the terminal receives a specific signal that includes a PSS from a BS. In this case, the specific signal may include the PSS and/or the SSS transmitted from at least one BS.

After the terminal receives the specific signal, in step, S2610, the terminal compensate the specific signal with respect to at least one time offset candidate. Herein, the at least one time offset candidate described above may be selected among a plurality of time offset candidates in relation to the time synchronization of the specific signal.

For example, the terminal may compensate the specific signal as much as the value corresponding to the selected time offset candidate in the time domain. For another example, the terminal may compensate the specific signal as much as the value corresponding to a first time offset candidate, and the terminal may compensate the specific signal as much as the value corresponding to a second time offset candidate.

After the terminal compensates the specific signal, in step, S2615, the terminal performs differentiation of symbol unit for the compensated specific signal and the PSS reference signal generated in the terminal, respectively, and thus, generates at least one first differentiation value of the specific signal and at least one second differentiation value of the PSS reference signal.

In other words, the terminal may generate at least one first differentiation value by performing differentiation of symbol unit for the compensated specific signal, and may generate at least one second differentiation value by performing differentiation of symbol unit for the reference signal for the PSS.

In this case, the operation of generating the at least one first differentiation value and the at least one second differentiation value may be performed simultaneously, sequentially or inversely.

Here, the differentiation of symbol unit may mean the symbol-level differentiation described above. In addition, the PSS reference signal may be generated according to the predefined rule between the terminal and the BS.

In addition, the differentiation of symbol unit may include the differentiation applied between at least one first sample included in a first symbol generated by performing the FFT operation by the terminal and at least one second sample included in a second symbol which is adjacent to the first symbol.

Furthermore, the at least one first differentiation value of the specific signal may mean the differentiation value for the received signal (or differentiated received signal) described above, and the at least one second differentiation value of the PSS reference signal may mean the differentiation value for the PSS reference signal (or differentiated PSS reference signal).

In other words, for the at least one time offset candidate, the terminal may compensate the specific signal, and may generate the differentiation value for the compensated signal and the PSS reference signal, respectively.

After the terminal generate the at least one first differentiation value and the at least one second differentiation value, in step, S2620, the terminal may calculate the cross correlation value between the generated at least one first differentiation value and the generated at least one second differentiation value.

In this case, the terminal may perform the operation in step, S2515 of FIG. 25 described above. Here, at least one first differentiation value described above may mean the differentiated received signal and at least one second differentiation value may mean the differentiated reference signal.

In addition, the cross correlation value may mean the peak value among the cross correlation values.

In this case, for the at least one time offset candidate, the terminal may compensate the specific signal, and may calculate at least one cross correlation value with respect to the at least one compensated specific signal.

After the terminal calculates the cross correlation value, in step, S2625, the terminal estimates the time offset and the frequency offset included in the specific signal. In this case, the terminal may estimate the time offset and the frequency offset based on the time offset candidate that corresponds to the greatest cross correlation value from at least one cross correlation value which is calculated with respect to at least one time offset candidate.

In this case, the terminal may determine the time offset candidate that corresponds to the greatest cross correlation value to be the estimated time offset of the PSS included in the specific signal. In addition, based on the determined estimated time offset, the terminal may determine an estimated frequency offset of the PSS included in the specific signal.

In more particular, the estimated frequency offset may be estimated by performing conjugated multiplexing for the PSS reference signal and the time-compensated specific signal which is time-compensated by using the estimated time offset.

The terminal may synchronize time and frequency using the time offset and the frequency offset estimated according to the procedures described above. Accordingly, the terminal may use the estimated time offset and the frequency offset in order to detect an SSS.

In addition, in the various embodiments of the present invention, in the case that the PSS included in the specific signal is configured as the ZC sequence, the estimated frequency offset may be determined based on the correlation function between the frequency-shifted specific signal and the PSS reference signal. In this case, the correlation function may be expressed as the form of Dirac delta function.

Furthermore, in the various embodiments of the present invention, in the case that the cover code is included in the PSS included in the specific signal, the terminal may generate at least one third differentiation value of the cover code. Here, the at least one third differentiation value of the cover code may mean a differentiated cover code.

In this case, the terminal may calculate the cross correlation value between the at least one first differentiation value generated in step, S2615 and the at least one third differentiation value.

General Apparatus to which the Present Invention May be Applied

Figure 27:
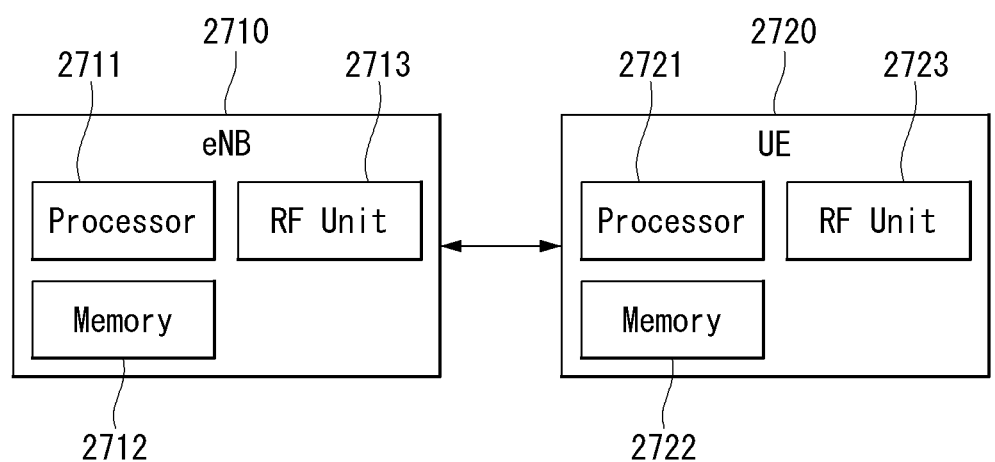
FIG. 27 illustrates a block diagram of a wireless communication apparatus according to an embodiment of the present invention.

FIG. 27 illustrates a block diagram of a wireless communication apparatus according to an embodiment of the present invention.

Referring to FIG. 27, the wireless communication system includes a BS (eNB) 2710 and a plurality of terminals (UEs) 2720 located within the region of the BS 2710.

The BS 2710 includes a processor 2711, a memory 2712 and a radio frequency (RF) unit 2713. The processor 2711 implements the functions, processes and/or methods proposed in FIGS. 1 to 26 above. The layers of wireless interface protocol may be implemented by the processor 2711. The memory 2712 is connected to the processor 2711, and stores various types of information for driving the processor 2711. The RF unit 2713 is connected to the processor 2711, and transmits and/or receives radio signals.

The terminal 2720 includes a processor 2721, a memory 2722 and a RF unit 2723. The processor 2721 implements the functions, processes and/or methods proposed in FIGS. 1 to 26 above. The layers of wireless interface protocol may be implemented by the processor 2721. The memory 2722 is connected to the processor 2721, and stores various types of information for driving the processor 2721. The RF unit 2723 is connected to the processor 2721, and transmits and/or receives radio signals.

The memories 2712 and 2722 may be located interior or exterior of the processors 2711 and 2721, and may be connected to the processors 2711 and 2721 with well known means. In addition, the BS 2710 and/or the terminal 2720 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

Although the method of synchronizing frequency and time in a wireless communication system of the present invention is described mainly for the example applied to 3GPP LTE/LTE-A system, it is also possible to be applied to various wireless communication system as well as 3GPP LTE/LTE-A system.

According to an embodiment of the present invention, when a terminal synchronizes frequency and/or time using a synchronization signal, the complexity of receiver of the terminal may be decreased.

The effects of the present invention are not limited to the above-described effects and other effects which are not described herein will become apparent to those skilled in the art from the description.

What is claimed is:

1. A method for synchronizing frequency and time in a wireless communication system, the method performed by a terminal comprising, receiving, from a base station, a specific signal including a primary synchronization signal (PSS);

generating at least one first differential value by differentiating the specific signal in a symbol unit;

generating at least one second differential value by differentiating a reference signal for the PSS in a symbol unit, wherein the reference signal for the PSS is generated according to a predefined rule between the terminal and the base station;

calculating at least one cross correlation value, wherein the calculating at least one cross correlation value comprises calculating at least one cross correlation value between the generated at least one first differential value and the generated at least one second differential value;

determining a largest cross correlation value among the at least one calculated cross correlation value;

determining a time offset candidate corresponding to the largest cross correlation value as an estimated time offset for the PSS;

compensating the specific signal based on the determined time offset, if all time offset candidates are considered;

performing a conjugated multiplexing calculation in the time domain on the compensated specific signal and the reference signal for the PSS; and determining a frequency offset by a first Fast Fourier Transform (FFT) operation in the frequency domain based on a result of the conjugated multiplexing calculation.

2. The method of claim 1, further comprising:

detecting a secondary synchronization signal by using the estimated time offset and the estimated frequency offset.

3. The method of claim 1, wherein the differentiating of the specific signal and the differentiating the reference signal includes differentiating between at least one first sample included in a first symbol and at least one second sample included in a second symbol adjacent to the first symbol of the specific signal and the reference signal, respectively; and the at least one first sample and the at least one second sample of the respective specific signal and the reference signal are generated by performing a second Fast Fourier Transform (FFT) operation.

4. The method of claim 1, wherein the largest cross correlation value is a peak value of the at least one cross correlation value.

5. The method of claim 1, wherein:

the time offset candidate is selected among a plurality time offset candidates related to time synchronization for the specific signal.

6. The method of claim 1, wherein the calculating at least one cross correlation value comprises:

when a cover code is included in the PSS, generating at least one third differential value by differentiating the cover code in a symbol unit; and calculating at least one cross correlation value between the generated at least one first differential value and the generated at least one third differential value.

7. The method of claim 1, wherein the PSS included in the specific signal comprises a synchronization signal for a wireless communication system supporting a narrowband system.

8. An apparatus for synchronizing frequency and time in a wireless communication system comprising:

a transmission/reception unit for transmitting and receiving a radio signal, and a processor functionally coupled to the transmission/reception unit, wherein the processor is configured to control to:

receive, from a base station, a specific signal including a primary synchronization signal (PSS);

generate at least one first differential value by differentiating the specific signal in a symbol unit;

generate at least one second differential value by differentiating a reference signal for the PSS in a symbol unit, wherein the reference signal for the PSS is generated according to a predefined rule between the terminal and the base station;

calculate at least one cross correlation value between the generated at least one first differential value and the generated at least one second differential value;

determine a largest cross correlation value among the at least one calculated cross correlation value;

determine a time offset candidate corresponding to the largest cross correlation value as an estimated time offset for the PSS;

compensate the specific signal based on the determined time offset, if all time offset candidates are considered;

perform a conjugated multiplexing calculation in the time domain on the compensated specific signal and the reference signal for the PSS; and determine a frequency offset by Fast Fourier Transform (FFT) operation in the frequency domain based on a result of the conjugated multiplexing calculation.

* * * * *